US012684560B2

(12) United States Patent (10) Patent No.: US 12,684,560 B2
Myung et al. (45) Date of Patent: Jul. 14, 2026

(54) METHOD OF TRANSMITTING/RECEIVING DOWNLINK CONTROL INFORMATION AND APPARATUS FOR SAME

(71) Applicant: LG ELECTRONICS INC., Seoul (KR)

(72) Inventors: Sechang Myung, Seoul (KR); Suckchel Yang, Seoul (KR); Seonwook Kim, Seoul (KR); Youngdae Lee, Seoul (KR); Duckhyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 770 days.

(21) Appl. No.: 17/917,883

(22) PCT Filed: Apr. 6, 2021

(86) PCT No.: PCT/KR2021/004235
§ 371 (c)(1),
(2) Date: Oct. 7, 2022

(87) PCT Pub. No.: WO2021/206398
PCT Pub. Date: Oct. 14, 2021

(65) Prior Publication Data
US 2023/0143581 A1 May 11, 2023

Related U.S. Application Data

(60) Provisional application No. 63/032,715, filed on May 31, 2020, provisional application No. 63/006,676, filed on Apr. 7, 2020.

(30) Foreign Application Priority Data

Jul. 23, 2020 (KR) ........................ 10-2020-0091853

(51) Int. Cl.
*H04W 72/1268* (2023.01)
*H04L 1/1607* (2023.01)
(Continued)

(52) U.S. Cl.
CPC ....... *H04W 72/1268* (2013.01); *H04L 1/1614* (2013.01); *H04L 1/1812* (2013.01); *H04W 72/23* (2023.01)

(58) Field of Classification Search
CPC ............. H04W 72/1268; H04W 72/23; H04L 1/1614; H04L 1/1812; H04L 1/1822; H04L 5/0055
See application file for complete search history.

(56) References Cited

U.S. PATENT DOCUMENTS

2012/0176957 A1* 7/2012 Chen ...................... H04B 7/155
370/315
2019/0141693 A1 5/2019 Guo et al.
(Continued)

FOREIGN PATENT DOCUMENTS

KR 1020140012662 2/2014
WO 2017043916 3/2017

OTHER PUBLICATIONS

LG Electronics., "Channel access procedure for NR-U" 3GPP TSG-RAN WG1 Meeting #99, R1-1912389, Nov. 2019, 21 pages.
(Continued)

*Primary Examiner* — Sujoy K Kundu
*Assistant Examiner* — Raul Rivas
(74) *Attorney, Agent, or Firm* — LEE, HONG, DEGERMAN, KANG & WAIMEY

(57) ABSTRACT

Disclosed in the present disclosure is a method by which a terminal receives downlink control information (DCI) in a wireless communication system. In particular, the method is characterized by transmitting at least one configured
(Continued)

granted-physical uplink shared channel (CG-PUSCH), transmitting at least one dynamic granted-PUSCH (DG-PUSCH), and receiving DCI comprising a HARQ-ACK bitmap for the at least one DG-PUSCH and the at least one CG-PUSCH, wherein the HARQ-ACK bitmap may comprise N bits, an M bit included in the HARQ-ACK bitmap may be for at least one CG-PUSCH, and an N-M bit included in the HARQ-ACK bitmap may be for the at least one DG-PUSCH.

11 Claims, 20 Drawing Sheets

(51) Int. Cl.
  *H04L 1/1812* (2023.01)
  *H04W 72/23* (2023.01)

(56) References Cited

U.S. PATENT DOCUMENTS

2020/0128621 A1* 4/2020 Chang .................. H04W 76/11
2020/0295878 A1* 9/2020 Choi ..................... H04L 1/1861

OTHER PUBLICATIONS

NTT Docomo, Inc., "Configured grant enhancement for NR-U," 3GPP TSG-RAN WG1 #100-e, R1-2000913, e-Meeting, Feb. 2020, 8 pages.
PCT International Application No. PCT/KR2021/004235, International Search Report dated Jul. 13, 2021, 3 pages.

* cited by examiner (a) Uplink Tx procedure based on dynamic grant          (b) Uplink Tx procedure based on configured grant (a) Option 1

(b) Option 2

Initial transmission

Following repetition (a) Carrier aggregation between L-band and U-band (b) Standalone U-band(s)

METHOD OF TRANSMITTING/RECEIVING DOWNLINK CONTROL INFORMATION AND APPARATUS FOR SAME

CROSS-REFERENCE TO RELATED APPLICATIONS

This application is the National Stage filing under 35 U.S.C. 371 of International Application No. PCT/KR2021/004235, filed on Apr. 6, 2021, which claims the benefit of earlier filing date and right of priority to Korean Application No. 10-2020-0091853, filed on Jul. 23, 2020, and also claims the benefit of U.S. Provisional Application No. 63/006,676, filed on Apr. 7, 2020, and 63/032,715, filed May 31, 2020, the contents of which are all incorporated by reference herein in their entirety

TECHNICAL FIELD

The present disclosure relates to a method of transmitting and receiving downlink control information (DCI) and an apparatus therefor, and more particularly to a method of transmitting a HARQ-ACK bitmap for a configured granted (CG)-physical uplink shared channel (PUSCH) and dynamic granted (DG)-PUSCH through DCI and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

The present disclosure provides a method of transmitting and receiving downlink control information and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of receiving downlink control information (DCI) by a user equipment (UE) in a wireless communication system includes transmitting at least one configured granted-physical uplink shared channel (CG-PUSCH), transmitting at least one dynamic granted-PUSCH (DG-PUSCH), and receiving DCI including a HARQ-ACK bitmap for the at least one CG-PUSCH and the at least one DG-PUSCH, wherein the HARQ-ACK bitmap includes N bits, and M bits included in the HARQ-ACK bitmap are for the at least one CG-PUSCH, and N-M bits included in the HARQ-ACK bitmap are for the at least one DG-PUSCH Each of the N-M bits may be generated based on logical OR bundling between the at least one DG-PUSCH for at least one HARQ process ID included in a DG HARQ group.

Each of the M bits may be generated based on HARQ-ACK information of each of the at least one CG-PUSCH for each of at least one HARQ process ID included in a CG HARQ group.

Each of the M bits may be generated based on logical AND bundling between the at least one CG-PUSCH for each of at least one HARQ process ID included in a CG HARQ group.

Based on a time of receiving the DCI, HARQ-ACK information for M most recently received CG-PUSCHs may be mapped to the M bits, and based on the time of receiving the DCI, HARQ-ACK information for N-M most recently received DG-PUSCHs may be mapped to the N-M bits.

HARQ-ACK information of the at least one CG-PUSCH for the M bits may be determined based on all configured CG HARQ processes.

HARQ-ACK information of the at least one CG-PUSCH for the M bits may be determined based on at least one activated CG HARQ process among configured CG HARQ processes.

According to the present disclosure, a user equipment (UE) for downlink control information (DCI) in a wireless communication system includes at least one transceiver, at least one processor, and at least one memory operatively connected to the at least one processor and configured to store instructions that when executed causes the at least one processor to perform operations, wherein the operations includes transmitting at least one configured granted-physical uplink shared channel (CG-PUSCH) through the at least one transceiver, transmitting at least one dynamic granted-PUSCH (DG-PUSCH) through the at least one transceiver, and receiving DCI including a HARQ-ACK bitmap for the at least one CG-PUSCH and the at least one DG-PUSCH through the at least one transceiver, the HARQ-ACK bitmap includes N bits, and M bits included in the HARQ-ACK bitmap are for the at least one CG-PUSCH, and N-M bits included in the HARQ-ACK bitmap are for the at least one DG-PUSCH.

Each of the N-M bits may be generated based on logical OR bundling between the at least one DG-PUSCH for at least one HARQ process ID included in a DG HARQ group.

Each of the M bits may be generated based on HARQ-ACK information of each of the at least one CG-PUSCH for each of at least one HARQ process ID included in a CG HARQ group.

Each of the M bits may be generated based on logical AND bundling between the at least one CG-PUSCH for each of at least one HARQ process ID included in a CG HARQ group.

Based on a time of receiving the DCI, HARQ-ACK information for M most recently received CG-PUSCHs may be mapped to the M bits, and based on the time of receiving the DCI, HARQ-ACK information for N-M most recently received DG-PUSCHs may be mapped to the N-M bits.

HARQ-ACK information of the at least one CG-PUSCH for the M bits may be determined based on all configured CG HARQ processes.

HARQ-ACK information of the at least one CG-PUSCH for the M bits may be determined based on at least one activated CG HARQ process among configured CG HARQ processes.

According to the present disclosure, an apparatus for receiving downlink control information (DCI) in a wireless communication system includes at least one processor, and at least one memory operatively connected to the at least one processor and configured to store instructions that when executed causes the at least one processor to perform operations, wherein the operations includes transmitting at least one configured granted-physical uplink shared channel (CG-PUSCH), transmitting at least one dynamic granted-PUSCH (DG-PUSCH), and receiving DCI including a HARQ-ACK bitmap for the at least one CG-PUSCH and the at least one DG-PUSCH, wherein the HARQ-ACK bitmap includes N bits, and M bits included in the HARQ-ACK bitmap are for the at least one CG-PUSCH, and N-M bits included in the HARQ-ACK bitmap are for the at least one DG-PUSCH.

According to an embodiment of the present disclosure, a method of transmitting downlink control information (DCI) by a base station (BS) in a wireless communication system includes receiving at least one configured granted-physical uplink shared channel (CG-PUSCH), receiving at least one dynamic granted-PUSCH (DG-PUSCH), and transmitting DCI including a HARQ-ACK bitmap for the at least one CG-PUSCH and the at least one DG-PUSCH, wherein the HARQ-ACK bitmap includes N bits, and M bits included in the HARQ-ACK bitmap are for the at least one CG-PUSCH, and N-M bits included in the HARQ-ACK bitmap are for the at least one DG-PUSCH.

According to the present disclosure, a base station (BS) for transmitting downlink control information (DCI) in a wireless communication system includes at least one transceiver, at least one processor, and at least one memory operatively connected to the at least one processor and configured to store instructions that when executed causes the at least one processor to perform operations, wherein the operations includes receiving at least one configured granted-physical uplink shared channel (CG-PUSCH), receiving at least one dynamic granted-PUSCH (DG-PUSCH), and transmitting DCI including a HARQ-ACK bitmap for the at least one CG-PUSCH and the at least one DG-PUSCH, wherein the HARQ-ACK bitmap includes N bits, and M bits included in the HARQ-ACK bitmap are for the at least one CG-PUSCH, and N-M bits included in the HARQ-ACK bitmap are for the at least one DG-PUSCH.

An embodiment of the present disclosure provides a computer-readable storage medium including at least one computer program for causing at least one processor to perform an operation, the operation including transmitting at least one configured granted-physical uplink shared channel (CG-PUSCH); transmitting at least one dynamic granted-PUSCH (DG-PUSCH), and receiving DCI including a HARQ-ACK bitmap for the at least one CG-PUSCH and the at least one DG-PUSCH, wherein the HARQ-ACK bitmap includes N bits, and M bits included in the HARQ-ACK bitmap are for the at least one CG-PUSCH, and N-M bits included in the HARQ-ACK bitmap are for the at least one DG-PUSCH.

Advantageous Effects

According to the present disclosure, the size of a field of a Downlink Control Information (DCI) format used in a communication system requiring high reliability may be variable, and in order to satisfy requirements of high reliability, a payload size may be reduced compared with other DCI formats, and thus when the size of the HARQ-ACK bitmap included in the DCI may be variable, the HARQ-ACK bitmap may be efficiently configured.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
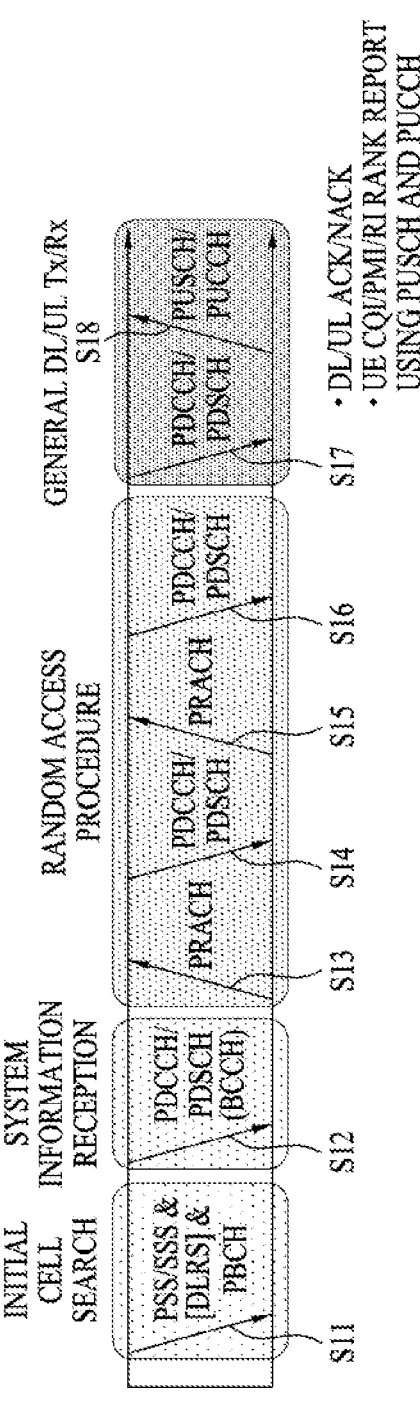
FIG. 1 illustrates physical channels and a general signal transmission method using the physical channels in a 3rd generation partnership project (3GPP) system as an exemplary wireless communication system.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates physical channels and a general signal transmission method using the physical channels in a 3GPP system.

When a UE is powered on or enters anew cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
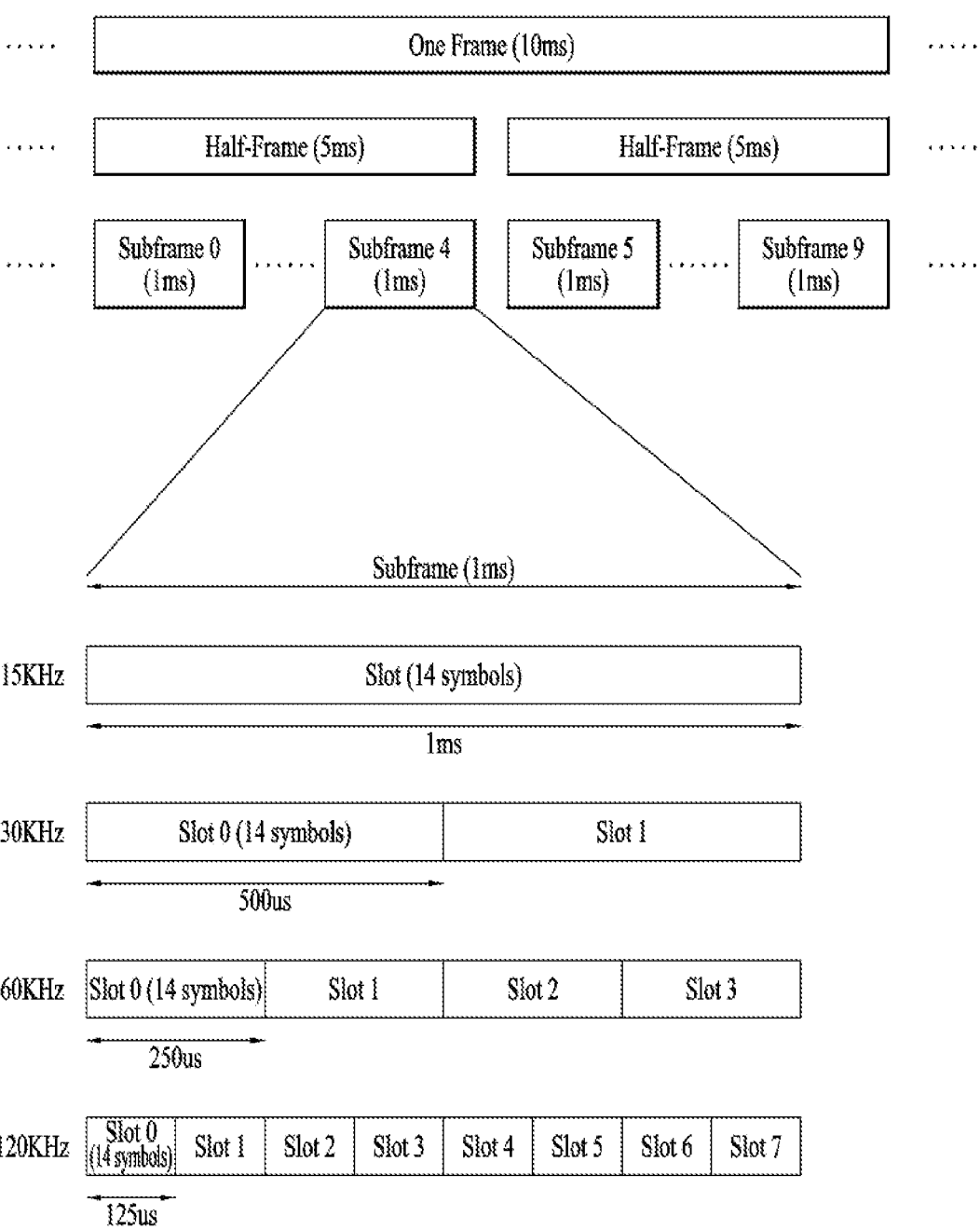
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS ($15 * 2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
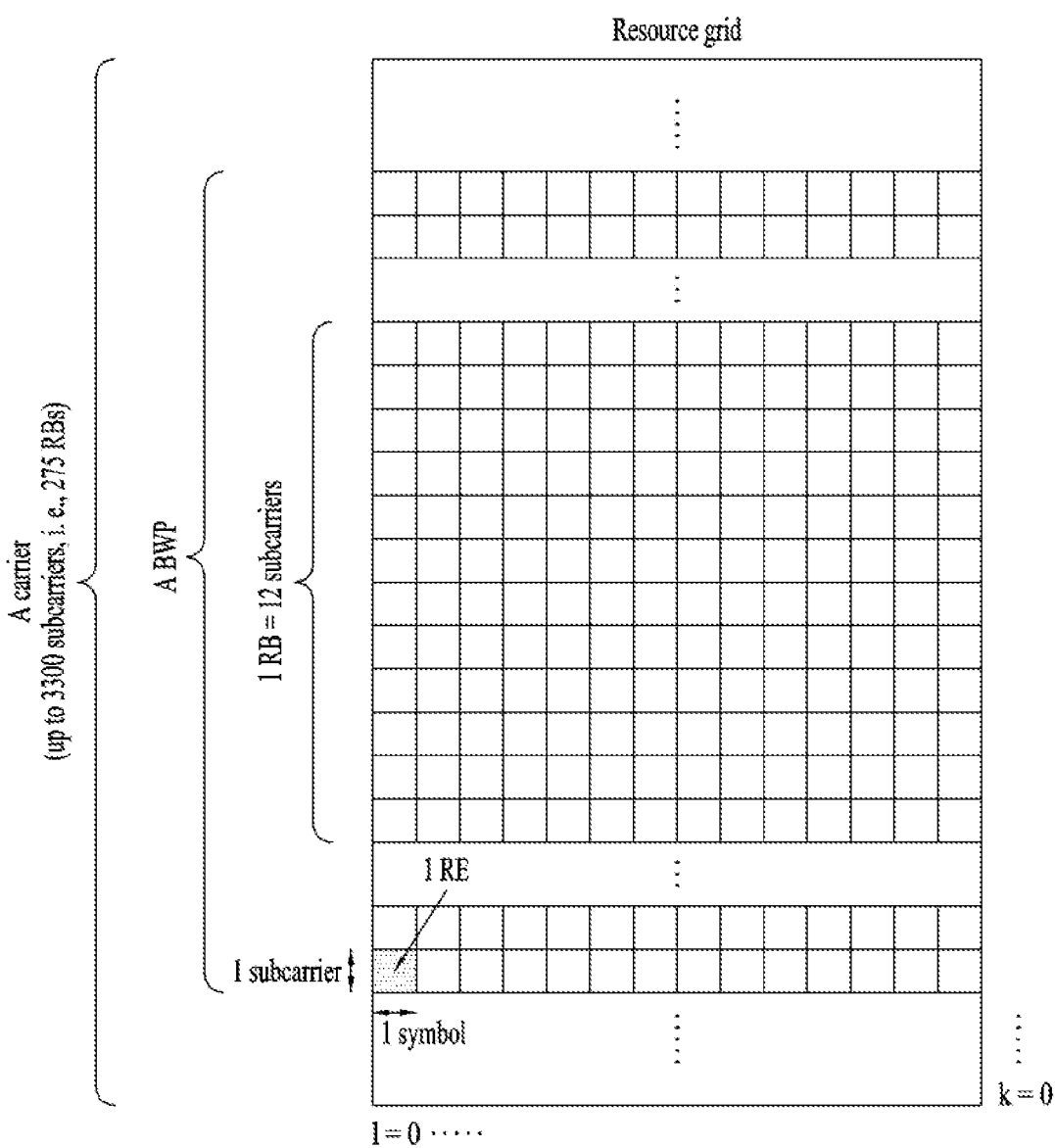
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
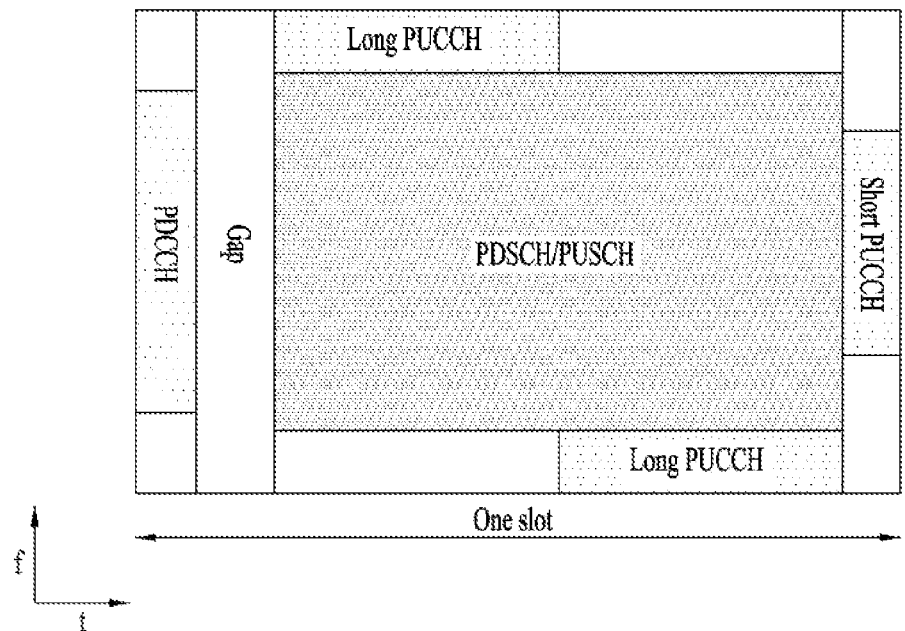
FIG. 4 illustrates exemplary mapping of physical channels in a slot.

FIG. 4 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time Now, a detailed description will be given of physical channels.

DL Channel Structures

An eNB transmits related signals on later-described DL channels to a UE, and the UE receives the related signals on the DL channels from the eNB.

(1) Physical Downlink Shared Channel (PDSCH)

The PDSCH carries DL data (e.g., a DL-shared channel transport block (DL-SCH TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P)RB.

The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). For example, the following parameters/information may be used to configure a CORESET, and a plurality of CORESETs may overlap with each other in the time/frequency domain.

controlResourceSeId: indicates the ID of a CORESET.

frequencyDomainResources: indicates the frequency area resources of the CORESET. The frequency area resources are indicated by a bitmap, and each bit of the bitmap corresponds to an RB group (i.e., six consecutive RBs). For example, the most significant bit (MSB) of the bitmap corresponds to the first RB group of a BWP. An RB group corresponding to a bit set to 1 is allocated as frequency area resources of the CORESET.

duration: indicates the time area resources of the CORESET. It indicates the number of consecutive OFDMA symbols in the CORESET. For example, the duration is set to one of 1 to 3.

cce-REG-MappingType: indicates a CCE-to-REG mapping type. An interleaved type and a non-interleaved type are supported.

precoderGranularity: indicates a precoder granularity in the frequency domain.

tci-StatesPDCCH: provides information indicating a transmission configuration indication (TCI) state for the PDCCH (e.g., TCI-StateID). The TCI state is used to provide the quasi-co-location relation between DL RS(s) in an RS set (TCI-state) and PDCCH DMRS ports.

tci-PresentInDCI: indicates whether a TCI field is included in DCI.

pdcch-DMRS-ScramblingID: provides information used for initialization of a PDCCH DMRS scrambling sequence.

To receive the PDCCH, the UE may monitor (e.g., blind-decode) a set of PDCCH candidates in the CORESET. The PDCCH candidates are CCE(s) that the UE monitors for PDCCH reception/detection. The PDCCH monitoring may be performed in one or more CORESETs in an active DL BWP on each active cell configured with PDCCH monitoring. A set of PDCCH candidates monitored by the UE is defined as a PDCCH search space (SS) set. The SS set may be a common search space (CSS) set or a UE-specific search space (USS) set.

Table 4 lists exemplary PDCCH SSs.

TABLE 4

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

The SS set may be configured by system information (e.g., MIB) or UE-specific higher-layer (e.g., RRC) signaling. S or fewer SS sets may be configured in each DL BWP of a serving cell. For example, the following parameters/information may be provided for each SS set. Each SS set may be associated with one CORESET, and each CORESET configuration may be associated with one or more SS sets.—searchSpaceId: indicates the ID of the SS set.

controlResourceSeId: indicates a CORESET associated with the SS set.

monitoringSlotPeriodicityAndOffset: indicates a PDCCH monitoring periodicity (in slots) and a PDCCH monitoring offset (in slots).

monitoringSymbolsWithinSlot: indicates the first OFDMA symbol(s) for PDCCH monitoring in a slot configured with PDCCH monitoring. The OFDMA symbols are indicated by a bitmap and each bit of the bitmap corresponds to one OFDM symbol in the slot. The MSB of the bitmap corresponds to the first OFDM symbol of the slot. OFDMA symbol(s) corresponding to bit(s) set to 1 corresponds to the first symbol(s) of the CORESET in the slot.

nrofCandidates: indicates the number of PDCCH candidates (e.g., one of 0, 1, 2, 3, 4, 5, 6, and 8) for each AL={11, 2, 4, 8, 16}.

searchSpaceType: indicates whether the SS type is CSS or USS.

DCI format: indicates the DCI format of PDCCH candidates.

The UE may monitor PDCCH candidates in one or more SS sets in a slot based on a CORESET/SS set configuration. An occasion (e.g., time/frequency resources) in which the PDCCH candidates should be monitored is defined as a PDCCH (monitoring) occasion. One or more PDCCH (monitoring) occasions may be configured in a slot.

Table 5 illustrates exemplary DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs. DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

UL Channel Structures

A UE transmits a related signal to the BS on a UL channel, which will be described later, and the BS receives the related signal from the UE through the UL channel to be described later.

(1) Physical Uplink Control Channel (PUCCH)

The PUCCH carries UCI, HARQ-ACK and/or scheduling request (SR), and is divided into a short PUCCH and a long PUCCH according to the PUCCH transmission length.

The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI: feedback information for a DL channel. Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration. PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

(2) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFTs-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

Figure 5:
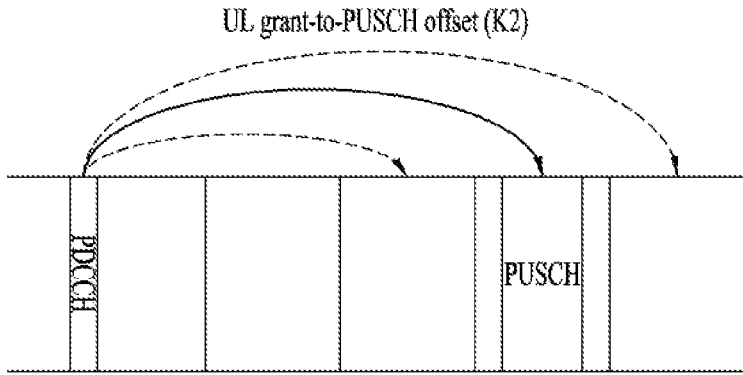
FIG. 5 illustrates a physical uplink shared channel (PUSCH) transmission process.
Figure 7:
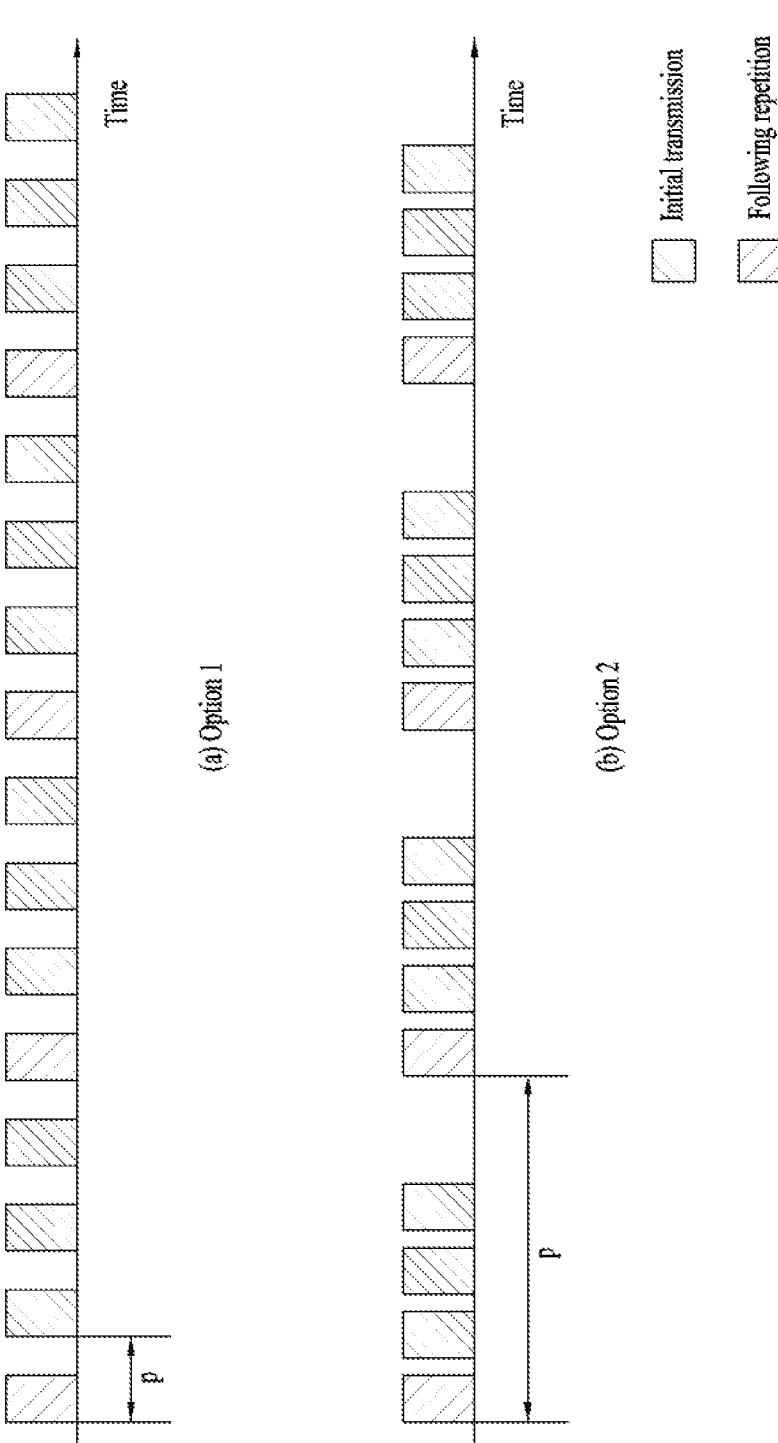
FIG. 7 illustrates exemplary repeated transmissions based on a configured grant.

FIG. 5 illustrates an exemplary PUSCH transmission process. Referring to FIG. 7, a UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit the PUSCH in slot #(n+K2) according to the scheduling information in slot #n. The PUSCH includes a UL-SCH TB.

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 2_1). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).

Type 2: the periodicity of a UL grant is configured by higher-layer signaling, and activation/deactivation of the CG is signaled by a PDCCH, to provide the UL grant.

Figure 6:
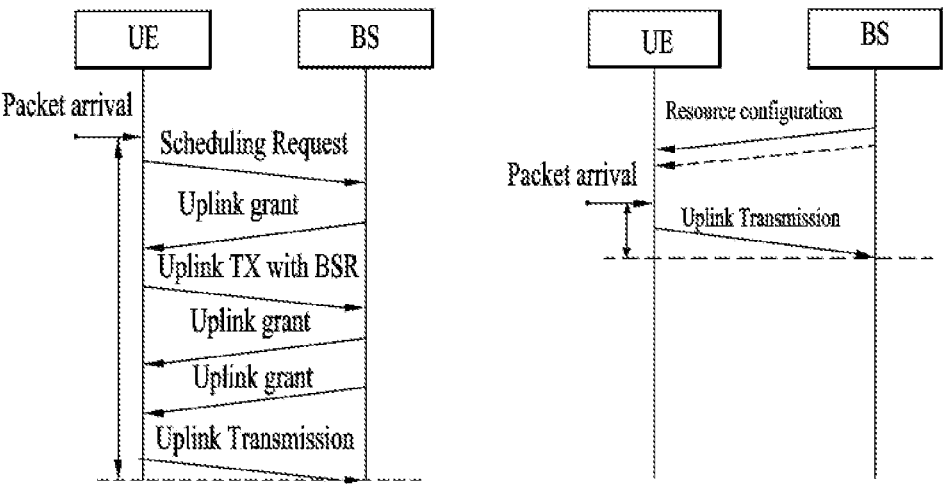
FIG. 6 illustrates exemplary uplink (UL) transmission operations of a user equipment (UE).

FIG. 6 illustrates exemplary UL transmission operations of a UE. The UE may transmit an intended packet based on a DG (FIG. 6(*a*)) or based on a CG (FIG. 6(*b*)).

Resources for CGs may be shared between a plurality of UEs. AUL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns $\{0, 2, 3, 1\}$, $\{0, 3, 0, 3\}$, and $\{0, 0, 0, 0\}$.

FIG. 7 illustrates exemplary repeated transmissions based on a CG.

The UE performs repeated transmissions until one of the following conditions is satisfied:

A UL grant for the same TB is successfully received;

The repetition number of the TB reaches K; and (In Option 2) the ending time of a period P is reached.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

Figure 8:
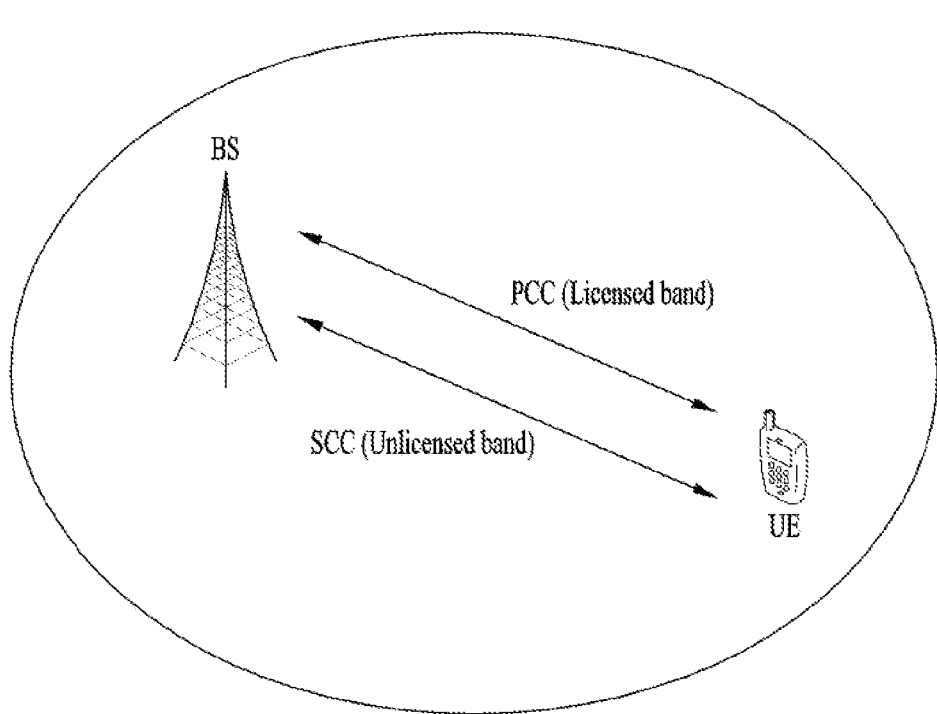
FIG. 8 illustrates a wireless communication system supporting an unlicensed band.
Figure 8:
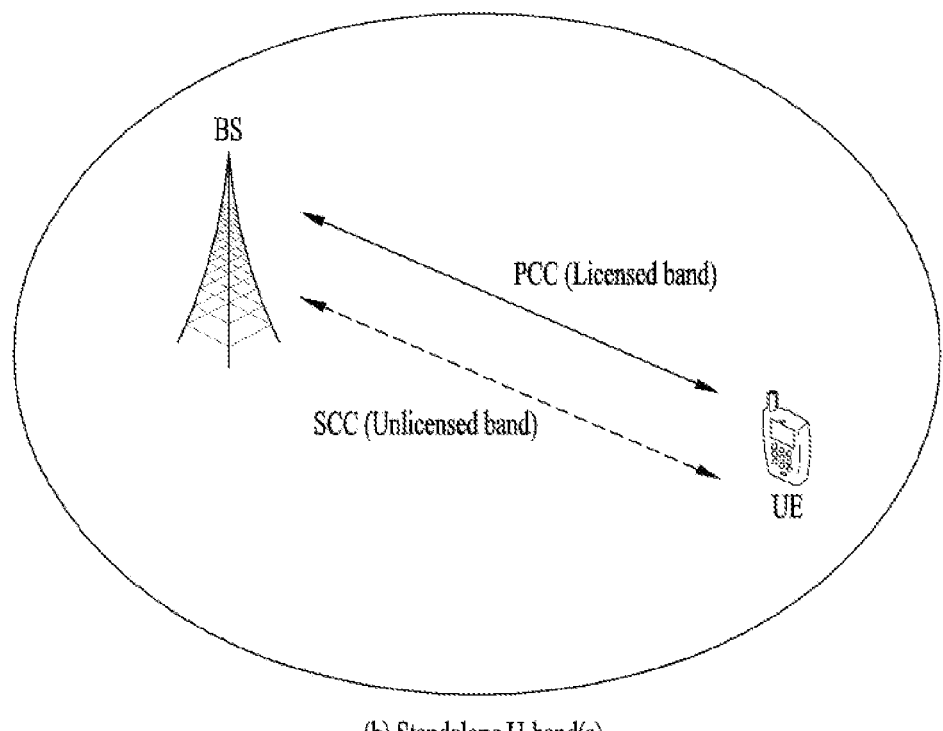

FIG. 8 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 8(*a*), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 8(*b*). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of Tsl=9 us. The BS or the UE senses the slot during a sensing slot duration. When power detected for at least 4 us within the sensing slot duration is less than an energy detection threshold Xthresh, the sensing slot duration Tsl is be considered to be idle. Otherwise, the sensing slot duration Tsl is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 9:
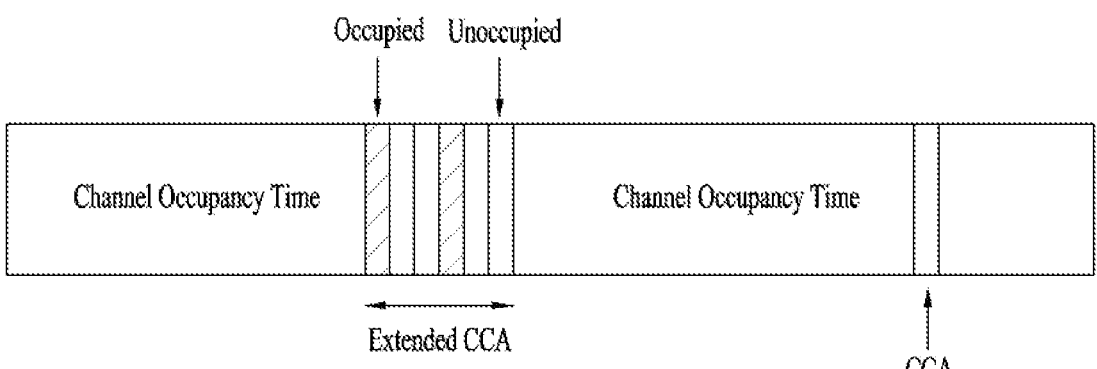
FIG. 9 illustrates an exemplary method of occupying resources in an unlicensed band.

FIG. 9 illustrates an exemplary method of occupying resources in an unlicensed band.

Referring to FIG. 9, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 7 describes an exemplary CAP supported in NR-U.

TABLE 7

| | Type | Explanation |
|---|---|---|
| DL | Type 1 CAP | CAP with random backoff time duration spanned by the sensing slots that are sensed to be idle before a downlink transmission(s) is random |
| | Type 2 CAP Type 2A, 2B, 2C | CAP without random backoff time duration spanned by sensing slots that are sensed to be idle before a downlink transmission(s) is deterministic |
| UL | Type 1 CAP | CAP with random backoff time duration spanned by the sensing slots that are sensed to be idle before a downlink transmission(s) is random |
| | Type 2 CAP Type 2A, 2B, 2C | CAP without random backoff time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information. A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

An eNB/gNB or UE of an LTE/NR system should also perform LBT for signal transmission in an unlicensed band (referred to as a U-band for convenience). When the eNB or UE of the LTE/NR system transmits a signal, other communication nodes such as a Wi-Fi node should also perform LBT so as not to cause interference with transmission by the eNB or the UE. For example, in the Wi-Fi standard (801.11ac), a CCA threshold is defined as −62 dBm for a non-Wi-Fi signal and −82 dBm for a Wi-Fi signal. For example, when the non-Wi-Fi signal is received by a station (STA) or an access point (AP) with a power of more than −62 dBm, the STA or AP does not transmit other signals in order not to cause interference.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 10:
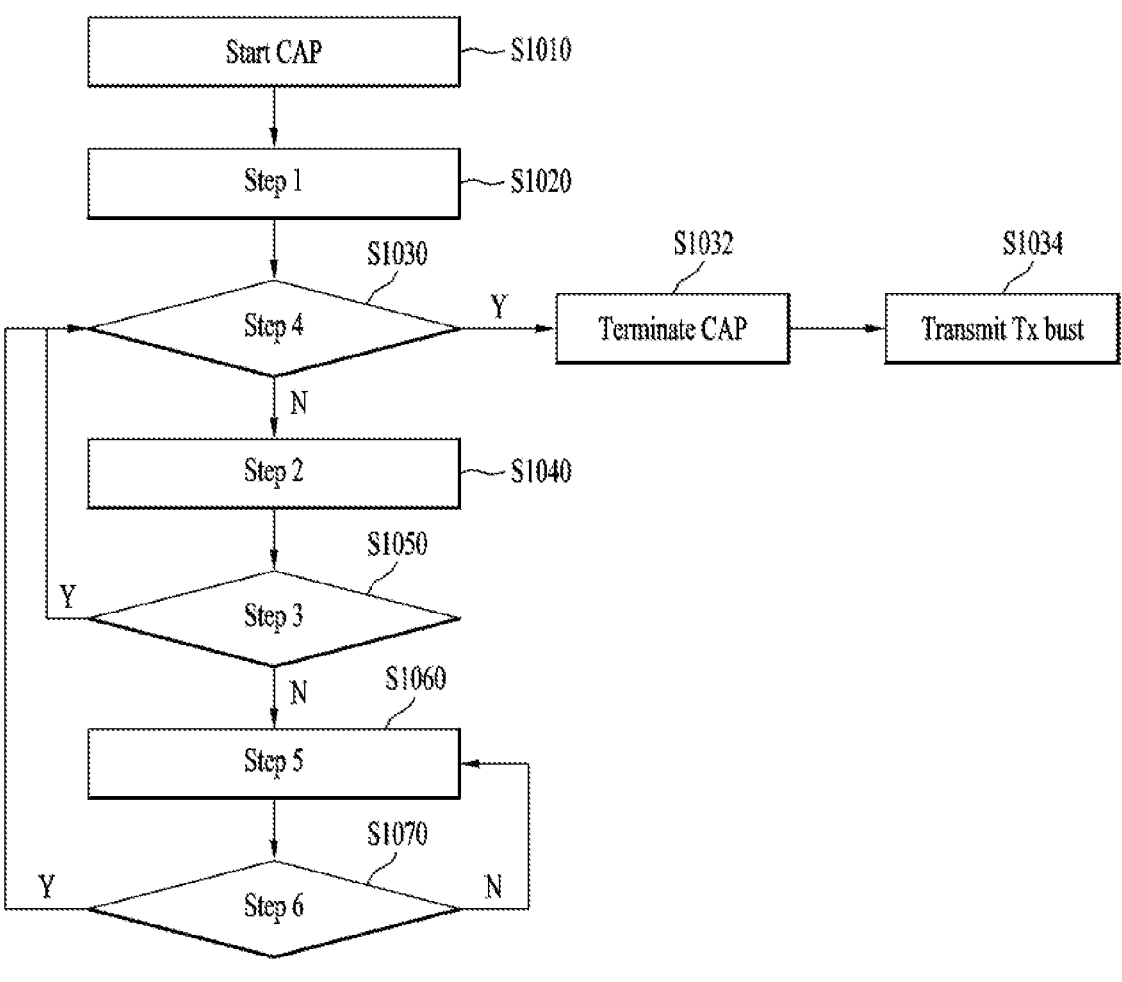
FIG. 10 illustrates an exemplary channel access procedure of a UE for UL signal transmission and/or DL signal transmission in an unlicensed band applicable to the present disclosure.

FIG. 10 illustrates Type 1 CAP among channel access procedures of a UE for UL/DL signal transmission in a U-band applicable to the present disclosure.

First, UL signal transmission in the U-band will be described with reference to FIG. 10.

The UE may sense whether a channel is idle for a sensing slot duration in a defer duration Td. After a counter N is decremented to 0, the UE may perform a transmission (S1034). The counter N is adjusted by sensing the channel for additional slot duration(s) according to the following procedure.

Step 1) Set $N=N_{init}$ where $N_{init}$ is a random number uniformly distributed between 0 and $CW_p$, and go to step 4 (S1020).

Step 2) If N>0 and the UE chooses to decrement the counter, set N=N−1 (S940).

Step 3) Sense the channel for an additional slot duration, and if the additional slot duration is idle (Y), go to step 4. Else (N), go to step 5 (S1050).

Step 4) If N=0 (Y) (S1030), stop CAP (S1032). Else (N), go to step 2.

Step 5) Sense the channel until a busy sensing slot is detected within the additional defer duration $T_d$ or all slots of the additional defer duration $T_d$ are sensed as idle (S1060).

Step 6) If the channel is sensed as idle for all slot durations of the additional defer duration $T_d$ (Y), go to step 4. Else (N), go to step 5 (S1070).

Table 8 illustrates that $m_p$, a minimum CW, a maximum CW, a maximum channel occupancy time (MCOT), and an allowed CW size applied to a CAP vary according to channel access priority classes.

TABLE 8

| Channel Access Priority Class (p) | mp | CWmin, p | CWmax, p | Tulmcot, p | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration $T_d$ includes a duration $T_f$ (16 us) immediately followed by $m_p$ consecutive slot durations where each slot duration $T_{sl}$ is 9 us, and $T_f$ includes a sensing slot duration Tis at the start of the 16-us duration. $CW_{wmin,p} <= CW_p <= CW_{max,p}$. $CW_p$ is set to $CW_{min,p}$, and may be updated before Step 1 based on an explicit/implicit reception response to a previous UL burst (e.g., PUSCH) (CW size update). For example, $CW_p$ may be initialized to $CW_{min,p}$ based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration $T_{short\_dl}$ (=25 us). $T_{short\_dl}$ includes a duration $T_f$ (=16 us) and one immediately following sensing slot duration. In the Type 2A UL CAP, $T_f$ includes a sensing slot at the start of the duration. In the Type 2B UL CAP, the UE may transmit a signal immediately after the channel is sensed as idle during a sensing slot duration $T_f$(=16 us). In the Type 2B UL CAP, $T_f$ includes a sensing slot within the last 9 us of the duration. In the Type 2C UL CAP, the UE does not sense a channel before a transmission.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

Now, DL signal transmission in the U-band will be described with reference to FIG. 10.

The BS may perform one of the following U-band access procedures (e.g., channel access procedures (CAPs)) to transmit a DL signal in the U-band.

(1) Type 1 DL CAP Method

In a Type 1 DL CAP, the length of a time duration spanned by sensing slots that are sensed to be idle before transmission(s) is random. The Type 1 DL CAP may be applied to the following transmissions:

transmission(s) initiated by the BS, including (i) a unicast PDSCH with user plane data, or (ii) a unicast PDSCH with user plane data and a unicast PDCCH scheduling the user plane data; or transmission(s) initiated by the BS, including (i) only a discovery burst, or (ii) a discovery burst multiplexed with non-unicast information.

Referring to FIG. 10, the BS may first sense whether a channel is idle for a sensing slot duration of a defer duration Td. Next, if a counter N is decremented to 0, transmission may be performed (S1034). The counter N is adjusted by sensing the channel for additional slot duration(s) according to the following procedures.

Step 1) Set N=Ninit where Ninit is a random number uniformly distributed between 0 and $CW_p$, and go to step 4 (S1020).

Step 2) If N>0 and the BS chooses to decrement the counter, set N=N−1 (S1040).

Step 3) Sense the channel for an additional slot duration, and if the additional slot duration is idle (Y), go to step 4. Else (N), go to step 5 (S1050).

Step 4) If N=0 (Y), stop a CAP (S1032)). Else (N), go to step 2 (S1030).

Step 5) Sense the channel until a busy sensing slot is detected within the additional defer duration Td or all slots of the additional defer duration Td are sensed to be idle (S1060).

Step 6) If the channel is sensed to be idle for all slot durations of the additional defer duration Td (Y), go to step 4. Else (N), go to step 5 (S1070).

Table 9 illustrates that mp, a minimum CW, a maximum CW, an MCOT, and an allowed CW size, which are applied to a CAP, vary according to channel access priority classes.

TABLE 9

| Channel Access Priority Class (p) | $m_p$ | CWmin, p | CWmax, p | Tulmcot, p | allowed CWp sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration Td includes a duration Tf (16 μs) immediately followed by mp consecutive sensing slot durations where each sensing slot duration Tsl is 9 μs, and Tf includes the sensing slot duration Tsl at the start of the 16-μs duration.

CWmin,p<=$CW_p$<=CWmax,p. $CW_p$ is set to CWmin,p, and may be updated (CW size update) before Step 1 based on HARQ-ACK feedback (e.g., ratio of ACK signals or NACK signals) for a previous DL burst (e.g., PDSCH). For example, $CW_p$ may be initialized to CWmin,p based on HARQ-ACK feedback for the previous DL burst, may be increased to the next highest allowed value, or may be maintained at an existing value.

(2) Type 2 DL CAP Method

In a Type 2 DL CAP, the length of a time duration spanned by sensing slots sensed to be idle before transmission(s) is deterministic. Type 2 DL CAPs are classified into Type 2A DL CAP, Type 2B DL CAP, and Type 2C DL CAP.

The Type 2A DL CAP may be applied to the following transmissions. In the Type 2A DL CAP, the BS may transmit a signal immediately after a channel is sensed to be idle during at least a sensing duration Tshort_dl=25 μs. Tshort_dl includes a duration Tf (=16 μs) and one immediately following sensing slot duration. Tf includes the sensing slot at the start of the duration.

Transmission(s) initiated by the BS, including (i) only a discovery burst, or (ii) a discovery burst multiplexed with non-unicast information, or Transmission(s) of the BS after a gap of 25 μs from transmission(s) by the UE within shared channel occupancy.

The Type 2B DL CAP is applicable to transmission(s) performed by the BS after a gap of 16 μs from transmission(s) by the UE within shared channel occupancy. In the Type 2B DL CAP, the BS may transmit a signal immediately after a channel is sensed to be idle during Tf=16 μs. Tf includes a sensing slot within the last 9 μs of the duration. The Type 2C DL CAP is applicable to transmission(s) performed by the BS after a maximum of a gap of 16 μs from transmission(s) by the UE within shared channel occupancy. In the Type 2C DL CAP, the BS does not sense a channel before performing transmission.

Unlike the LTE system in which a transport block (TB)-based or codeword-based HARQ procedure is performed, the NR system supports code block group (CBG)-based transmission of single-bit/multi-bit HARQ-ACK feedback. A TB may be mapped to one or more code blocks (CBs) according to the size of the TB. For example, in a channel coding procedure, a cyclic redundancy check (CRC) code is attached to the TB. If a CRC-attached TB is not larger than a certain size, the CRC-attached TB corresponds to one CB. However, if the CRC-attached TB is larger than the certain size, the CRC-attached TB is segmented into a plurality of CBs. In the NR system, the UE may be configured to receive CBG-based transmissions, and retransmission may be scheduled to carry a subset of all CBs of the TB.

CBG-Based HARQ Procedure

In LTE, a TB-based HARQ procedure is supported. In NR, a CBG-based HARQ procedure is supported together with the TB-based HARQ procedure.

Figure 11:
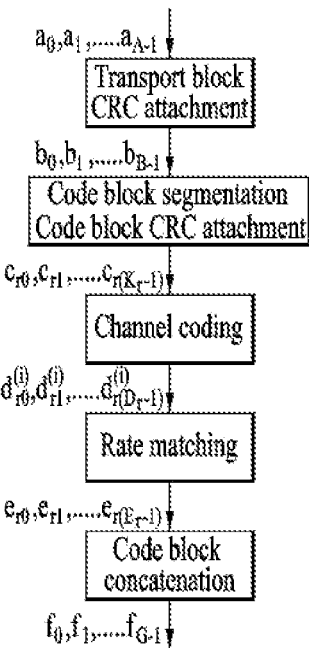
FIGS. 11 and 12 are views illustrating code block group (CBG)-based HARQ-ACK transmission in an NR system.
Figure 11:
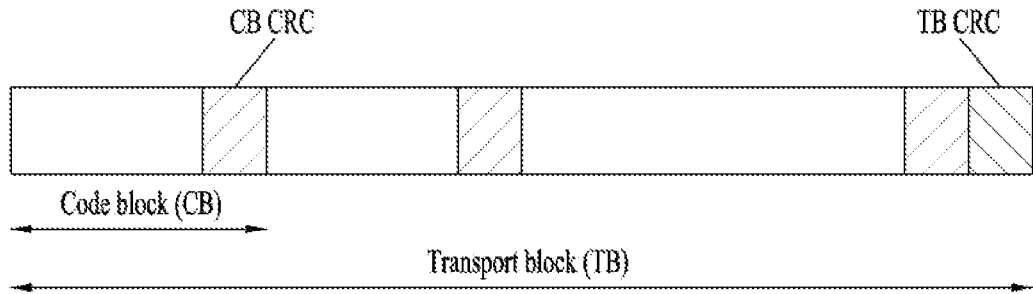

FIG. 11 illustrates a TB processing procedure and a TB structure. The procedure illustrated in FIG. 11 may be applied to data of transport channels including a DL-SCH, a PCH, and an MCH. A UL TB (or data of a UL transport channel) may also be processed in a similar manner Referring to FIG. 11, a transmitter attaches a (e.g., 24-bit) CRC (a TB CRC) to a TB for error check. Thereafter, the transmitter may segment the CRC-attached TB into a plurality of CBs in consideration of the size of a channel encoder. For example, in LTE, a maximum size of a CB is 6144 bits. Accordingly, if a TB size is 6144 bits or less, the CB is not configured and, if the TB size is larger than 6144 bits, the TB is divided into 6144-bit segments to thus configure a plurality of CBs. A (e.g., 24-bit) CRC (CB CRC) is individually attached to each CB for error check. The CBs are concatenated into a codeword after channel coding and rate matching. In the TB-based HARQ procedure, data scheduling and a related HARQ procedure are performed in units of TBs and the CB CRC is used to determine early termination of TB decoding.

Figure 12:
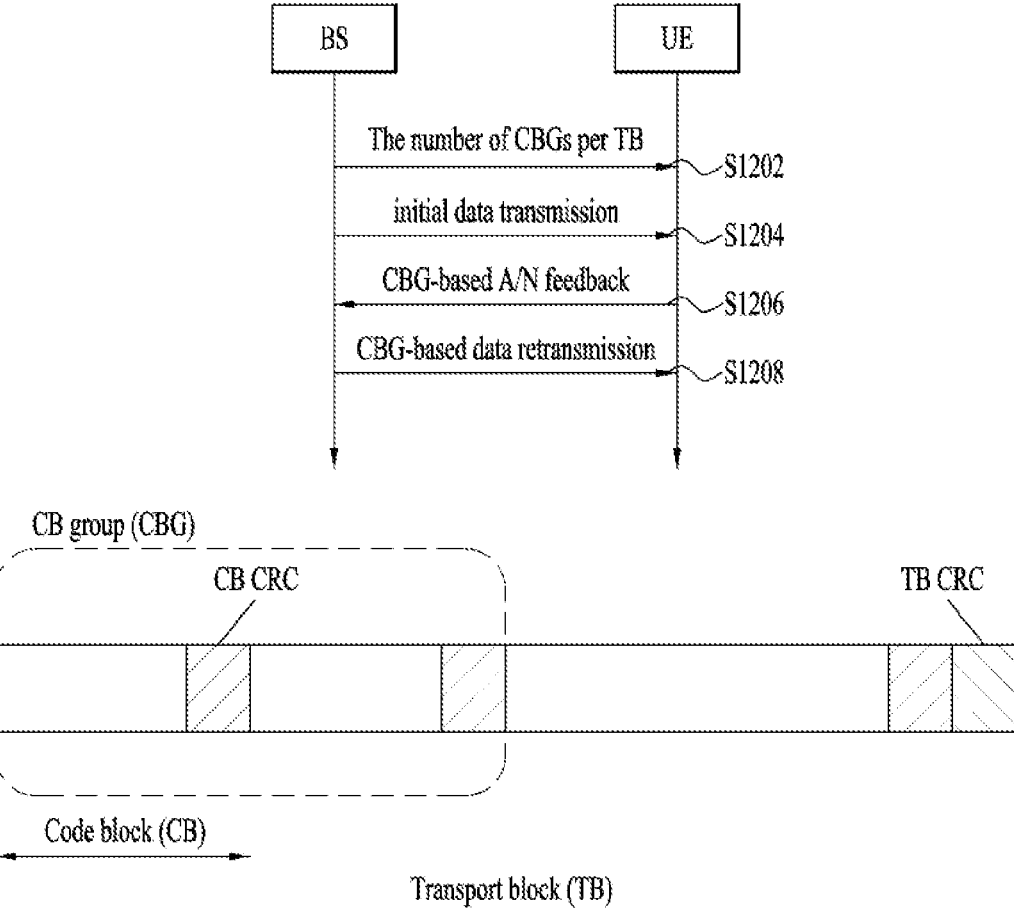

FIG. 12 illustrates a CBG-based HARQ procedure. In the CBG-based HARQ procedure, data scheduling and a related HARQ process may be performed in units of TBs.

Referring to FIG. 12, the UE may receive, from the gNB, information about the number M of CBGs per TB by a higher-layer signal (e.g., an RRC signal) (S1102). The UE may then receive initial data transmission (on a PDSCH) from the gNB (S1104). The data may include a TB, the TB may include a plurality of CBs, and the plural CBs may be divided into one or more CBGs. Some of the CBGs may include ceiling(K/M) CBs and the other CBGs may include flooring (K/M) CBs. K represents the number of CBs in the data. Next, the UE may feed back CBG-based ACK/NACK (A/N) information for the data to the gNB (S1106) and the gNB may perform CBG-based data retransmission (S1108). The A/N information may be transmitted on a PUCCH or a PUSCH. The A/N information may include a plurality of A/N bits for the data and each A/N bit may indicate an A/N response generated on a CBG basis for the data. The payload size of the A/N information may be maintained equal according to M irrespective of the number of CBGs constituting the data.

Hybrid Automatic Repeat and reQuest (HARQ) Procedure

When there are a plurality of UEs having data to be transmitted in uplink/downlink in a wireless communication system, a BS selects a UE to which data is to be transmitted every Transmission Time Interval (TTI) (e.g., a subframe, or a slot). In a multi-carrier and a similarly operated system, the BS selects UEs to which data is to be transmitted in uplink/downlink for each TTI, and also selects a frequency band used by the corresponding UE for data transmission.

When described with reference to uplink, UEs transmit a reference signal (or a pilot) in uplink, and a BS recognizes a channel state of the UEs using the reference signal transmitted from the UEs and selects UEs to which data is transmitted in uplink in each unit frequency band for each TTI. The BS notifies the UE of this result. That is, the BS transmits an uplink assignment message to transmit data using a specific frequency band to a UE scheduled for uplink at a specific TTI. The uplink assignment message is also referred to as a UL grant. The UE transmits data in uplink according to the uplink assignment message. The uplink assignment message may include UE Identity (UE ID), RB assignment information, Modulation and Coding Scheme (MCS), Redundancy Version (RV) version, New Data indication (NDI), and the like.

In the case of the synchronous HARQ scheme, a retransmission time is systematically promised (e.g., 4 subframes after a NACK reception time) (synchronous HARQ). Therefore, a UL grant message transmitted by the BS to the UE needs only to be transmitted during initial transmission, and subsequent retransmission is performed according to an ACK/NACK signal (e.g., a PHICH signal). In the case of the asynchronous HARQ scheme, since retransmission times are not promised to each other, the BS needs to transmit a retransmission request message to the UE. In addition, in the case of a non-adaptive HARQ scheme, a frequency resource or MCS for retransmission may be the same as previous transmission, and in the case of an adaptive HARQ scheme, a frequency resource or MCS for retransmission may be different from previous transmission. For example, in the case of the asynchronous adaptive HARQ scheme, since the frequency resource or MCS for retransmission varies for each transmission time, the retransmission request message may include UE ID, RB allocation information, HARQ Process ID/number, RV, and NDI information.

Figure 13:
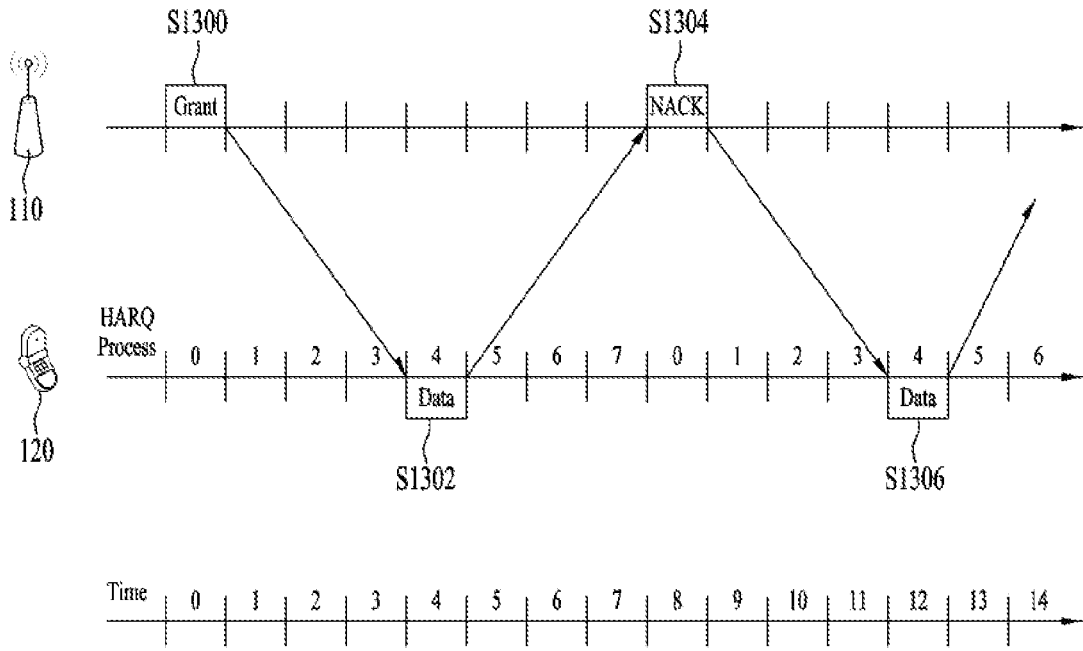
FIG. 13 is a diagram for explaining a HARQ Process.

Referring to FIG. 13, there are a plurality of parallel HARQ Processes for DL/UL transmission in a BS/UE. The plurality of parallel HARQ processes allow continuous DL/UL transmission while waiting for HARQ feedback for successful or unsuccessful reception of previous DL/UL transmission. Each HARQ process is related to a HARQ buffer of a Medium Access Control (MAC) layer. Each HARQ Process manages state variables related to the number of transmissions of MAC Physical Data Blocks (PDUs) in the buffer, HARQ feedback for MAC PDUs in the buffer, and the current redundancy version. When 8-channel HARQ is used, the HARQ Process ID is given as 0 to 7. In the synchronous HARQ scheme, the HARQ Process ID is sequentially connected to a time unit (TU) as shown. On the other hand, in the asynchronous HARQ scheme, the HARQ Process ID is designated by a network (e.g., a BS) during data scheduling. Here, the TU may be replaced with a data transmission occasion (e.g., a subframe or a slot).

Referring to FIG. 13, a BS 110 may transmit a UL grant to a UE 120 through a PDCCH (S1300). The UE 120 may transmit UL data to the BS 110 through a PUSCH using the RB and MCS designated by a UL grant after k0 TU (e.g., TU k0) from a time when the UL grant is received (e.g., TU 0) (S1302). The BS 110 may decode the UL data received from the UE 120. If decoding of the UL data fails, the BS 110 may transmit a NACK to the UE 120 (S1304). In the non-adaptive HARQ scheme, NACK may be transmitted through an ACK/NACK transport channel (e.g., Physical HARQ Indicator Channel (PHICH)). On the other hand, in the adaptive HARQ scheme, the NACK may be indicated through the NDI of the UL grant. The UE 120 may retransmit UL data after k0' TU from a time of receiving the NACK (S1306). The same HARQ process may be responsible for initial transmission and retransmission of UL data (e.g., HARQ Process 4). In the synchronous HARQ scheme, k0 and k0' may have fixed values (e.g., k0=k0'=4). On the other hand, in the synchronous HARQ scheme, k0 and k0' may be indicated by PDCCH-to-PUSCH timing indication information in the UL grant.

On LAA UL and NR system, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n−3)-th subframe has been configured as a reference subframe, and the CW size has been adjusted based on a new data indicator (NDI) for a HARQ process ID corresponding to the reference subframe. That is, when the BS toggles NDIs per one or more transport blocks (TBs) or instructs that one or more TBs be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

The BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

The biggest difference between autonomous uplink (AUL) of LTE LAA and a CG of NR is a HARQ-ACK feedback transmission method for a PUSCH that the UE has transmitted without receiving a UL grant and the presence or absence of UCI transmitted along with the PUSCH. While a HARQ process is determined by an equation of a symbol index, a symbol periodicity, and the number of HARQ processes in the CG of NR, explicit HARQ-ACK feedback information is transmitted in AUL downlink feedback information (AUL-DFI) in LTE LAA. Further, in LTE LAA, UCI including information such as a HARQ ID, an NDI, and an RV is also transmitted in AUL UCI whenever AUL PUSCH transmission is performed. In the case of the CG of NR, the BS identifies the UE by time/frequency resources and DMRS resources used for PUSCH transmission, whereas in the case of LTE LAA, the BS identifies the UE by a UE ID explicitly included in the AUL UCI transmitted together with the PUSCH as well as the DMRS resources.

Before a description of proposed methods, NR-based channel access schemes for an unlicensed band used in the present disclosure are classified as follows.

Category 1 (Cat-1): the next transmission immediately follows the previous transmission after a switching gap within a COT, and the switching gap is shorter than 16 us, including even a transceiver turn-around time. Cat-1 LBT may correspond to the above-described Type 2C CAP.

Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 us may correspond to the above-described Type 2A CAP, and Cat-2 LBT with a minimum sensing duration of 16 us may correspond to the above-described Type 2B CAP. The minimum sensing durations are merely exemplary, and a minimum sensing duration less than 25 us or 16 us (e.g., a minimum sensing duration of 9 us) may also be available.

Category 3 (Cat-3): an LBT method with fixed contention window size (CWS)i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

The following description is given with the appreciation that the term band may be interchangeably used with CC/cell, and a CC/cell (index) may be replaced with a BWP (index) configured within the CC/cell, or a combination of the CC/cell (index) and the BWP (index).

Terms are defined as follows.

UCI: control information transmitted on UL by the UE. UCI includes various types of control information (i.e., UCI types). For example, the UCI may include an HARQ-ACK (simply, A/N or AN), an SR, and CSI.

PUCCH: a physical layer UL channel for UCI transmission. For convenience, PUCCH resources configured and/or indicated for A/N, SR, and CSI transmission are referred to as A/N PUCCH resources, SR PUCCH resources, and CSI PUCCH resources, respectively.

UL grant DCI: DCI for a UL grant. For example, UL grant DCI means DCI formats 0_0 and 0_1, and is transmitted on a PDCCH.

DL assignment/grant DCI: DCI for a DL grant. For example, DL assignment/grant DCI means DCI formats 1_0 and 1_1, and is transmitted on a PDCCH.

PUSCH: a physical layer UL channel for UL data transmission.

Slot: a basic time unit (TU) (or time interval) for data scheduling. A slot includes a plurality of symbols. Herein, a symbol includes an OFDM symbol (e.g., CP-OFDM symbol or DFT-s-OFDM symbol). In this specification, the terms symbol, OFDM-based symbol, OFDM symbol, CP-OFDM symbol, and DFT-s-OFDM symbol may be replaced with each other.

Performing LBT for channel X/with respect to channel X: This means performing LBT in order to confirm whether to transmit channel X. For example, a CAP may be performed before transmission of channel X is started.

Similarly to AUL of LAA, Rel-16 NR-U Configured grant (CG) may allow the BS to transmit a decoding result for a CG-PUSCH transmitted by the UE through a 16-bit HARQ-ACK bitmap included in Configured Granted—Downlink Feedback Information (CG-DFI). The 16-bit HARQ-ACK bitmap may include not only a HARQ process ID configured to the CG but also a HARQ-ACK for a dynamic grant (DG) PUSCH scheduled with the UL grant for Contention Window Size (CWS) adjustment.

In a CG-PUSCH in a licensed band, the BS may not transmit separate HARQ-ACK information to the UE, and if there is no feedback for the CG-PUSCH for a predetermined time, the UE may regard the HARQ-ACK information for the PUSCH as ACK.

On the other hand, in a Rel-16 NR-U system, HARQ-ACK information for the CG-PUSCH may be transmitted through the CG-DFI. In this case, the CG-DFI may include HARQ-ACK information for the DG-PUSCH as well as HARQ-ACK information for the CG-PUSCH. This is to compensate for a situation in which DCI indicating retransmission for the DG-PUSCH is not capable of being transmitted due to LBT failure, and thus a CWS value is not appropriate and does not change even though the CWS value needs to be increased or reset.

Each 1 bit included in a HARQ-ACK bitmap may correspond to the HARQ-ACK of each HARQ process ID. In other words, an NR system may support up to 16 HARQ processes, and the HARQ-ACK bitmap included in the DFI may include all of the HARQ-ACKs for the 16 HARQ processes. This is, in order to transmit DCI in the Rel-16 NR-U system, it is necessary to succeed in LBT, and in this regard, since there is no guarantee at which time LBT succeeds, when an occasion to transmit DCI due to successful LBT occurs, the HARQ-ACK information for the 16 HARQ processes may be prevented from being omitted as much as possible by transmitting all of the HARQ-ACK for the 16 HARQ process.

In this case, it may be necessary to determine whether ACK or NACK information included in each bit of the 16-bit HARQ-ACK bitmap is valid.

For example, HARQ-ACK information corresponding to the HARQ Process ID of the CG-PUSCH may be determined to be valid when a PDCCH including the corresponding HARQ-ACK information is received after a predetermined number of symbols from the last symbol in which the corresponding CG-PUSCH is transmitted.

In addition, the HARQ-ACK information corresponding to the HARQ Process ID of the DG-PUSCH may be determined to be valid when a PDCCH including the corresponding HARQ-ACK information is received after a predetermined number of symbols from the last symbol in which the corresponding DG-PUSCH is transmitted.

If the DG-PUSCH is scheduled in multiple slots, and the received HARQ-ACK information is ACK, the HARQ-ACK information corresponding to the HARQ Process ID of the corresponding DG-PUSCH may be determined to be valid when a PDCCH including the corresponding HARQ-ACK information is received after a predetermined number of symbols from the last symbol of the DG-PUSCH transmitted in a first slot among the multiple slots.

If the DG-PUSCH is scheduled in multiple slots, and the received HARQ-ACK information is NACK, the HARQ-ACK information corresponding to the HARQ Process ID of the corresponding DG-PUSCH may be determined to be valid when a PDCCH including the corresponding HARQ-ACK information is received from a predetermined number of symbols from the last symbol of the DG-PUSCH transmitted in the last slot of the multiple slots.

In this case, the predetermined number of slots may be configured by higher layer signaling (e.g., RRC signaling).

Even if a bit related to the DG-PUSCH among bits of the HARQ-ACK bitmap included in the CG-DFI is NACK, the UE may not retransmit the DG-PUSCH based on the corresponding NACK information. That is, since the HARQ-ACK information for the DG-PUSCH included in the CG-DFI is only for CWS adjustment, even if the HARQ-ACK information for the corresponding DG-PUSCH is NACK, the UE may not retransmit the corresponding DG-PUSCH based on the corresponding NACK information.

In other words, when determining whether to retransmit the DG-PUSCH, the UE may determine whether to retransmit the DG-PUSCH based only on whether to toggle NDI corresponding to the HARQ Process of the corresponding DG-PUSCH included in the DG-PUSCH scheduling UL grant.

In addition, the CG-DFI may be distinguished from CG type 2 (de)activation according to a configuration of 1 bit of a DFI flag in DCI format 0_1 scrambled with the CS-RNTI. For example, if the UE operates in an unlicensed band and receives DCI format 0_1 scrambled with CS-RNTI, 1 bit of the DFI flag may be present in the corresponding DCI format 0_1. In this case, if a value of the corresponding 1 bit is 0, the received DCI format 0_1 may be used for indicating activating of CG type 2, and if the value of the corresponding 1 bit is 1, the received DCI format 0_1 may be used for the CG-DFI.

In Rel-16 ultra reliable low latency communication (URLLC), DCI format 0_2 for shortening the length of DCI and obtaining high reliability with a low code rate by variably configuring DCI fields is introduced. If DCI format 0_2 is introduced for CG-DFI transmission, that is, if DCI format 0_2 may be used for CG-DFI, a HARQ-ACK bitmap needs to be configured differently from a HARQ-ACK bitmap included in DCI format 0_1 due to restrictions on payload size, etc.

Therefore, in the present disclosure, a method of configuring a HARQ-ACK bitmap when CG-DFI transmission using DCI format 0_2 is introduced will be described.

Prior to a detailed description of the proposed methods according to the present disclosure, terms used in the proposed methods described in the present disclosure will be described.

One or more HARQ process IDs configured to a CG among HARQ process IDs may be referred to as a CG HARQ group, and one or more HARQ process IDs used for DG PUSCH transmission may be referred to as a DG HARQ group. In addition, the size of the CG HARQ group, that is, the number of HARQ process IDs configured to the CG may be defined as M. Here, M is equal to the size of the union of all HARQ process IDs configured when there are a plurality of CG configurations.

Alternatively, the M value (in particular, in the case of type 2 CG) may correspond to the number of HARQ process IDs indicated for CG use by (de)activation. In addition, when there are a plurality of CG configurations, it may mean the number of HARQ process IDs corresponding to one or more activated CG configurations. In this case, when the method proposed in the present disclosure is applied, mismatch between the UE and the BS may occur with respect to a time of transmitting (de)activation DCI and a time of applying the proposed method, and accordingly, when the time of transmitting the (de)activation DCI is slot #n, the time of applying the proposed method may be predefined after slot #n+k, and the corresponding k value may be predefined in the standard or may be configured by a higher layer signal (e.g., RRC signal).

In addition, in the following proposed methods, logical AND bundling means bundling in which the result value is NACK if at least one of the corresponding HARQ-ACK information is NACK, and the result value is ACK if all the corresponding HARQ-ACK information is ACK. In addition, logical OR bundling means bundling in which the result value is ACK if at least one of the corresponding HARQ-ACK information is ACK, and the result value is NACK if all the corresponding HARQ-ACK information is NACK.

Prior to a detailed description of the proposed methods, the overall operation process of a UE and a BS according to the proposed methods of the present disclosure will be described.

Figure 14:
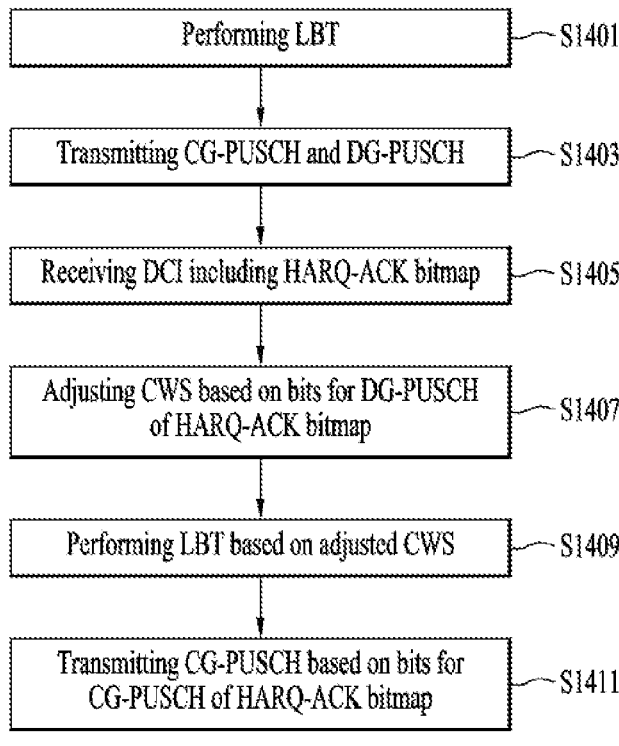
FIGS. 14 to 16 are diagrams for explaining the overall operation process of a UE, a BS, and a network according to an embodiment of the present disclosure.
Figure 15:
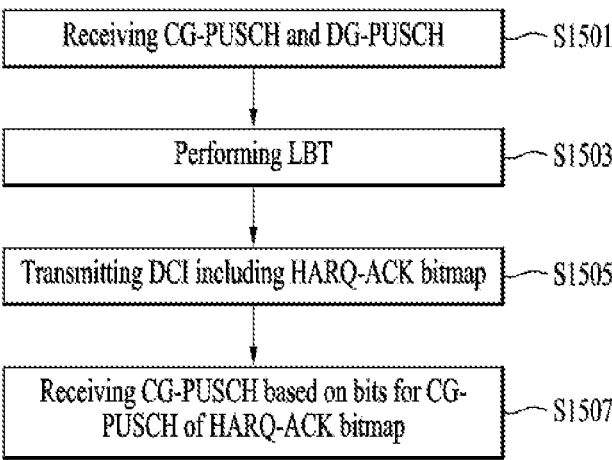
Figure 16:
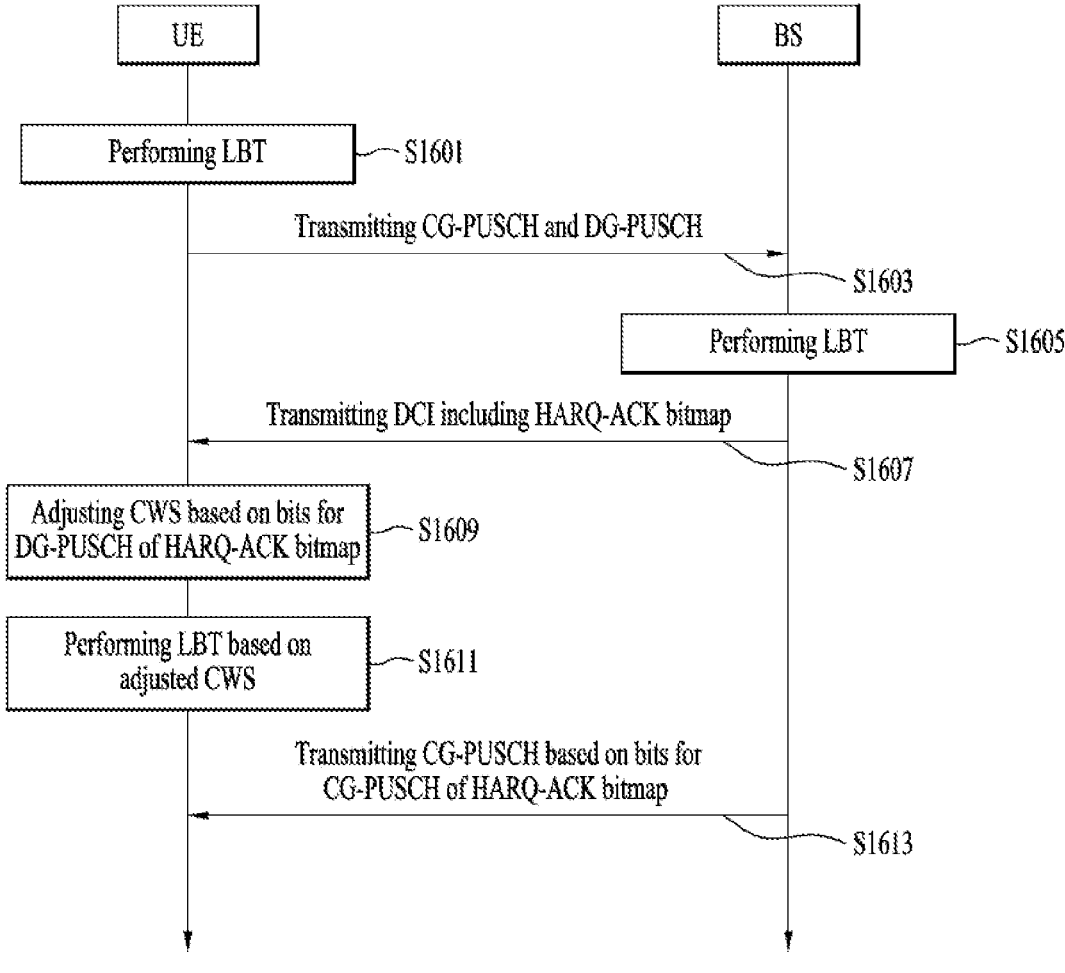

FIGS. 14 to 16 are diagrams for explaining the overall operation process of the UE and BS according to the proposed methods of the present disclosure.

Referring to FIG. 14, the overall operation process of the UE according to the proposed methods of the present disclosure is now described, and the UE may perform LBT for each of the CG-PUSCH and the DG-PUSCH (S1401). That is, the UE may perform LBT for CG-PUSCH transmission and LBT for DG-PUSCH transmission. When the LBT for the CG-PUSCH is successful, the UE may transmit the CG-PUSCH, and when the LBT for the DG-PUSCH is successful, the UE may transmit the DG-PUSCH (S1403).

Then, the UE may receive DCI (i.e., DCI for DFI use) including the HARQ-ACK bitmap related to the HARQ-ACK information of the transmitted CG-PUSCH and DG-PUSCH (S1405). Here, a detailed method for configuring the received HARQ-ACK bitmap and interpreting the HARQ-ACK bitmap by the UE may be based on [Proposed Method #1] to [Proposed Method #11], which will be described below.

The UE may adjust a CWS based on bits for the DG-PUSCH in the HARQ-ACK bitmap (S1407). For example, if there is at least one ACK in bits for the DG-PUSCH, the CWS may be maintained, and if all bits for DG-PUSCH are NACK, the CWS may be increased. In another example, when the DG-PUSCH corresponds to CBG-based transmission, if 10% or more of bits for the DG-PUSCH are ACK, the CWS may be maintained, and if ACK bits are less than 10%, the CWS may be increased.

The UE may perform LBT based on the adjusted CWS (S1409), and if the LBT is successful, the UE may transmit a CG-PUSCH based on the bits for the CG-PUSCH of the HARQ-ACK bitmap (S1411). For example, the CG-PUSCH for the HARQ process corresponding to the ACK bit among bits for the CG-PUSCH may transmit a new transport block/code block/code block group, and the CG-PUSCH for the HARQ process corresponding to the NACK bit may retransmit a transport block/code block/code block group.

FIG. 15 is a diagram for explaining the overall operation process of a BS according to the proposed methods of the present disclosure.

Referring to FIG. 15, the BS may receive the CG-PUSCH and the DG-PUSCH (S1501), and based on the decoding result of the received CG-PUSCH and DG-PUSCH, the BS may perform LBT in order to transmit HARQ-ACK information of the CG-PUSCH and the DG-PUSCH (S1503).

If the LBT is successful, the DCI (i.e., DCI for DFI use) including the HARQ-ACK bitmap related to the HARQ-ACK information of the CG-PUSCH and the DG-PUSCH may be transmitted (S1505). Here, a detailed method of configuring the HARQ-ACK bitmap by the BS may be based on [Proposed Method #1] to [Proposed Method #11], which will be described below.

The BS may receive the CG-PUSCH transmitted based on bits for the CG-PUSCH (S1507). For example, if the UE transmits the CG-PUSCH for the HARQ process corresponding to the ACK bit among the bits for the CG-PUSCH to the BS, the corresponding CG-PUSCH may be for transmitting a new transport block/code block/code block group. In addition, when the UE transmits the CG-PUSCH for the HARQ process corresponding to the NACK bit to the BS, the corresponding CG-PUSCH may be for retransmitting a transport block/code block/code block group.

FIG. 16 is a diagram for explaining the overall operation process of a network according to the proposed methods of the present disclosure.

Referring to FIG. 16, a UE may perform LBT for each of the CG-PUSCH and the DG-PUSCH (S1601). That is, the UE may perform LBT for CG-PUSCH transmission and LBT for DG-PUSCH transmission. If the LBT for the CG-PUSCH is successful, the UE may transmit the CG-PUSCH to the BS, and if the LBT for the DG-PUSCH is successful, the UE may transmit the DG-PUSCH to the BS (S1603).

The BS that receives the CG-PUSCH and the DG-PUSCH may perform LBT in order to transmit the HARQ-ACK information of the CG-PUSCH and the DG-PUSCH based on the decoding result of the received CG-PUSCH and DG-PUSCH (S1605).

If the LBT is successful, the BS may transmit DCI (i.e., DCI for DFI use) including a HARQ-ACK bitmap related to the HARQ-ACK information of the received CG-PUSCH and DG-PUSCH to the UE (S1607). A detailed method for configuring the HARQ-ACK bitmap by the BS may be based on [Proposed Method #1] to [Proposed Method #11], which will be described below.

The UE that receives the DCI may adjust the CWS based on bits for the DG-PUSCH in the HARQ-ACK bitmap (S1609). For example, if there is at least one ACK in bits for DG-PUSCH, the CWS may be maintained, and if all bits for DG-PUSCH are NACK, the CWS may be increased. In another example, when the DG-PUSCH corresponds to CBG-based transmission, if 10% or more of bits for DG-PUSCH are ACK, the CWS may be maintained, and if ACK bits are less than 10%, the CWS may be increased.

The UE may perform LBT based on the adjusted CWS (S1611), and if the LBT is successful, the CG-PUSCH may be transmitted to the BS based on bits for the CG-PUSCH of the HARQ-ACK bitmap (S1613). For example, if the UE transmits a CG-PUSCH for the HARQ process corresponding to the ACK bit among the bits for the CG-PUSCH to the BS, the corresponding CG-PUSCH may be for transmitting a new transport block/code block/code block group. In addition, when the UE transmits the CG-PUSCH for the HARQ process corresponding to the NACK bit to the BS, the CG-PUSCH may be for retransmitting a transport block/code block/code block group.

Hereinafter, based on the above description, detailed proposed methods for configuring the HARQ-ACK bitmap according to the present disclosure will be described.

[Proposed Method #1]

Among bits included in the DCI, when N bits are available for the HARQ-ACK bitmap, the CG HARQ group and the DG HARQ group may be distinguished to sequentially configure the HARQ-ACK bitmap.

For example, specific M bits (e.g., MSB M bits) of the HARQ-ACK bitmap may be configured to indicate HARQ-ACK information without bundling for the CG HARQ group, and specific N-M bits (e.g., LSB N-M bits) may be configured to indicate the HARQ-ACK information for the DG HARQ group by logical OR bundling.

However, according to the size of the HARQ-ACK bitmap for the CG HARQ group, logical AND bundling may be performed between CG HARQ process IDs to indicate HARQ-ACK information with specific M' bits (e.g., MSB M' bits), and logical OR bundling may be performed between DG HARQ Process IDs to indicate HARQ-ACK information with specific N-M' bits (e.g., LSB N-M' bits). For example, if the number of M' bits is smaller than the number of CG HARQ process IDs, the HARQ-ACK information of the CG HARQ group may be configured to be indicated based on logical AND bundling.

However, if the DG overrides the HARQ process ID configured to CG, logical AND bundling may always be applied.

In detail, since the size of several fields configuring DCI format 0_2 is variable depending on the configuration, the size of the HARQ-ACK bitmap configuring ACK/NACK of the CG/DG-PUSCH of DCI format 0_2 transmitted in CG-DFI may also be variable.

For example, when the HARQ-ACK bitmap is configured with N bits and the size of the CG HARQ group is M, the HARQ-ACK information for the CG-PUSCH included in the CG-DFI may be sequentially filled and configured from the first bit of the HARQ-ACK bitmap, and then, the HARQ-ACK information for DG-PUSCH may be configured in the remaining N-M bits.

If it is insufficient to include the HARQ-ACK information of all DG-PUSCHs with N-M bits, bundling may be performed, and in this regard, if DG-PUSCH HARQ-ACK on the CG-DFI is for adjusting the CWS and there is ACK for at least one of the HARQ-ACK information of a target DG-PUSCH of bundling, NACK for the remaining HARQ-ACK information may be configured with N-M bits using logical OR bundling because of a high probability that the NACK is caused by a general decoding failure due to a channel error or a Modulation & Coding Scheme (MCS) error rather than collision with other transmission due to a size of the CWS that is not sufficiently large.

Figure 17:
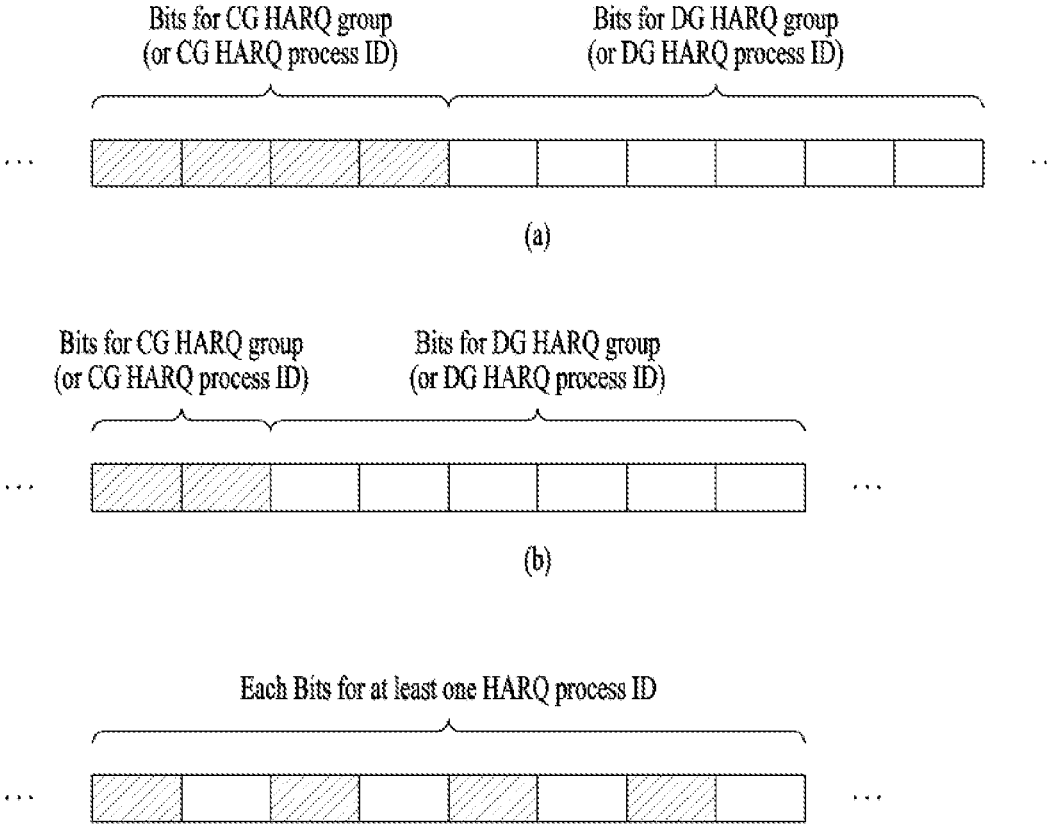
FIG. 17 is a diagram for explaining detailed examples for a HARQ-ACK bitmap in CG-DFI according to proposed methods of the present disclosure.

For example, as shown in FIG. 17(*a*), when the size of the HARQ-ACK bitmap is 10 bits and the size of the CG HARQ group is M=4, the HARQ-ACK information for the CG HARQ group may configure a bitmap with 4 bits without bundling, and 12 pieces of HARQ-ACK information for the DG HARQ group may be configured with 6 bits via logical OR bundling by two.

However, if the number of bits for the CG HARQ group is determined in the N-bit HARQ-ACK bitmap, and the number of bits for the CG HARQ group is smaller than M, bundling may be required even within the CG HARQ group.

For example, as shown in FIG. 17(*b*), when the size of the HARQ-ACK bitmap is 8 bits, a bit for the CG HARQ group is 2 bits among the 8 bits, and the size of the CG HARQ group is M=4, a 2-bit HARQ-ACK bitmap may be configured by sequentially performing logical AND bundling on two HARQ process IDs in the CG HARQ group, and the remaining 6 bits may configure a 6-bit HARQ-ACK bitmap by performing logical OR bundling on 12 HARQ-ACK information for the DG HARQ group by two. Here, in the case of the CG HARQ group, if there is any NACK among the HARQ process IDs that are the bundling target, retransmission of the CG-PUSCH needs to be indicated to the UE, and thus logical AND bundling may be performed to configure the HARQ-ACK bitmap.

In addition, if the HARQ process ID configured to a CG is included in at least one of the HARQ process IDs of the DG HARQ group configuring the 6-bit HARQ-ACK bitmap through the logical OR bundling operation, that is, if at least one HARQ process ID is included in the CG HARQ group among the HARQ process IDs of the DG HARQ group, the HARQ-ACK bitmap needs to be configured based on logical AND bundling rather than logical OR.

[Proposed Method #2]

The HARQ-ACK bitmap may be configured by performing bundling based on the size of the HARQ-ACK bitmap and the HARQ process ID without distinction of CG/DG.

However, the DG HARQ group may always perform logical OR bundling through a higher layer signal such as RRC, but if at least one HARQ process ID configured to a CG is included in the HARQ process ID to be bundled, logical AND bundling may be applied.

Since the size of various fields configuring DCI format 0_2 is variable depending on the configuration, the size of the HARQ-ACK bitmap configured with ACK/NACK of the CG/DG-PUSCH of DCI format 0_2 transmitted in the CG-DFI may also be variable.

Accordingly, the BS may configure a rule for each field included in DCI format 0_2 transmitted in CG-DFI to the UE during RRC setup, and the UE may know the size of the HARQ-ACK bitmap according to the rule. In addition, the BS may configure the type of bundling (e.g., logical OR bundling or logical AND bundling) to be applied when a bundling operation to be applied to each of the CG/DG HARQ groups and a target HARQ process ID of bundling are included in both the DG and the CG, that is, when one HARQ process ID is included in both the CG HARQ group and the DG HARQ group.

For example, as shown in FIG. 17(c), when the size of the HARQ-ACK bitmap is N=8, two HARQ process IDs for each bit configuring the HARQ-ACK bitmap may be associated without distinction of the DG/CG and bundling may be performed for each of the two HARQ process IDs.

For example, bundling may be performed by pairing two in the order of HARQ process ID like bundling of HARQ process ID #0 and HARQ process ID #1 and bundling of HARQ process ID #2 and HARQ process ID #3. In another example, bundling may be performed by pairing two HARQ process IDs to have a certain interval between the paired HARQ process IDs like bundling of HARQ process ID #0 and HARQ process ID #8 and bundling of HARQ process ID #1 and HARQ process ID #9.

Logical OR bundling may be performed between DG HARQ process IDs, and logical AND bundling may be performed between CG HARQ process IDs. In addition, if at least one CG HARQ ID is included in one pair, logical AND bundling may be performed. For example, HARQ process ID #0 and HARQ process ID #1 are paired, and in this regard, when HARQ process ID #0 is for the DG HARQ and HARQ process ID #1 is for the CG HARQ, logical AND bundling may be performed. If both HARQ process ID #0 and HARQ process ID #1 are for the DG HARQ, logical OR bundling may be performed, and if both HARQ process ID #0 and HARQ process ID #1 are for the CG HARQ, logical AND bundling may be performed.

However, despite bundling between two DG HARQ process IDs, if one or more DG HARQ process IDs among the two DG HARQ process IDs are also included in the CG HARQ process ID, that is, if the one or more DG HARQ process IDs are included in the CG HARQ group, logical AND bundling but not logical OR bundling may be performed to configure the HARQ-ACK bitmap.

[Proposed Method #3]

HARQ-ACK information corresponding to the CG HARQ group and the DG HARQ group may be separated into two different DFIs and may be transmitted without bundling.

However, the CG-DFI for the CG HARQ group and the CG-DFI for the DG HARQ group may reuse 1 bit of a specific field included in DCI format 0_2 as a flag bit or may be separated by adding a flag bit of 1 bit size.

In this case, according to the size of the HARQ-ACK bitmap of the DFI for each HARQ group, the HARQ-ACK information of the CG HARQ group may be used to perform logical AND bundling to generate a HARQ-ACK bitmap, and the HARQ-ACK information of the DG HARQ group may be used to perform logical OR bundling to generate a HARQ-ACK bitmap.

In addition, according to a prior appointment or BS configuration (e.g., RRC signaling and/or DCI signaling), the DFI corresponding to the DG HARQ group may not be transmitted, and only the DFI corresponding to the CG HARQ group may be transmitted.

In detail, since the size of several fields configuring DCI format 0_2 is variable depending on configuration, the size of the HARQ-ACK bitmap for the HARQ-ACK information of the CG/DG-PUSCH of DCI format 0_2 transmitted in CG-DFI may also be variable.

The HARQ-ACK information of the CG HARQ group included in the CG-DFI may be for instructing the UE to retransmit the CG-PUSCH when determined as NACK based on the actual decoding result, and the HARQ-ACK information of the DG HARQ group may be for CWS adjustment only, not for an actual HARQ operation. Therefore, when there is a restriction on the size of the HARQ bitmap included in DCI format 0_2 transmitted in the CG-DFI, the HARQ-ACK bitmap may be generated and transmitted without bundling by separating HARQ-ACK information to be included in the CG-DFI to distinguish the CG-DFI including only HARQ-ACK information of the CG HARQ group from the CG-DFI including only the HARQ-ACK information of the DG HARQ group.

However, when the size of the HARQ-ACK bitmap included in the CG-DFI for the CG HARQ group is smaller than M or the size of the HARQ-ACK bitmap included in the CG-DFI for the DG HARQ group is smaller than the number of DG HARQ process IDs of the DG HARQ group or the number of DG HARQ-ACK information, bundling may be required. In this case, the HARQ-ACK information of the CG HARQ group may be used to perform logical AND bundling to configure the HARQ-ACK bitmap included in the CG-DFI for the CG HARQ group, and the HARQ-ACK information of the DG HARQ group may be used to perform logical OR bundling to configure the HARQ-ACK bitmap included in the CG-DFI for the DG HARQ group.

Alternatively, the CG-DFI including the HARQ-ACK information corresponding to the DG HARQ group may not be transmitted, and only the CG-DFI including the HARQ-ACK information corresponding to the CG HARQ group may be transmitted.

[Proposed Method #4]

A method of differently interpreting the corresponding HARQ process ID for each bit of the HARQ-ACK bitmap according to a slot index through which the CG-DFI is transmitted will be described. In this case, the interpretation method may be predefined in a standard, and for example, may be an equation defined as a function of the slot index. Alternatively, the interpretation method may be configured through a higher layer signal such as RRC.

However, if bundling is required according to the size of the HARQ-ACK bitmap included in the CG-DFI transmitted in each slot, logical OR bundling may always be performed on the DG HARQ group using a higher layer signal such as RRC, and if at least one CG is included in the HARQ process ID to be bundled, logical AND bundling may be configured to be applied.

In detail, since the size of several fields configuring DCI format 0_2 is variable depending on the configuration, the size of the HARQ-ACK bitmap including the HARQ-ACK information of the CG/DG-PUSCH of DCI format 0_2 transmitted in CG-DFI may also be variable.

In this case, all of the HARQ-ACK information corresponding to the DG HARQ group and the CG HARQ group in one CG-DFI may be configured with the HARQ-ACK bitmap and may be transmitted, but the HARQ-ACK bitmap may be configured using only HARQ-ACK information corresponding to some of all the HARQ process IDs and the CG-DFI including the corresponding HARQ-ACK bitmap may be transmitted, but each bit corresponding to the HARQ-ACK bitmap included in the CG-DFI transmitted in each slot through an equation defined as a function of the slot index predefined in the standard or a higher layer signal such as RRC may be configured to differently interpret the corresponding HARQ process ID.

For example, according to the equation defined based on a slot index or RRC configuration, as shown in FIG. 17(c), when the size of the HARQ-ACK bitmap in the CG-DFI is 8 bits, bits configuring the HARQ-ACK bitmap included in the CG-DFI transmitted in slot index #0 may sequentially correspond to HARQ process IDs #0 to #7, respectively.

In addition, bits configuring the HARQ-ACK bitmap included in the CG-DFI transmitted in slot index #1 may sequentially correspond to HARQ process IDs #8 to #15 or HARQ process IDs #1 to #8, respectively.

[Proposed Method #5]

A method of transmitting HARQ-ACK information of M most recently transmitted CG-PUSCHs and HARQ-ACK information of N-M most recently transmitted DG PUSCHs in time order in the HARQ-ACK bitmap of N bits without bundling will be described.

Since the size of various fields configuring DCI format 0_2 is variable according to the configuration, the size of the HARQ-ACK bitmap for the CG/DG-PUSCH included in DCI format 0_2 transmitted for CG-DFI use may also be variable.

If the size of the HARQ-ACK bitmap included in the CG-DFI is N, the BS may select HARQ-ACK information to be included in the CG-DFI and may configure the HARQ-ACK bitmap depending on the number of the most recently received CG-PUSCH or the number of the most recently received DG-PUSCHs.

For example, based on slot index #0 for transmitting CG-DFI, HARQ-ACK information for M most recently received CG-PUSCHs may be first mapped to the front of the HARQ-ACK bitmap of N bits, and HARQ-ACK information corresponding to N-M most recently received DG-PUSCHs may be mapped to the remaining N-M bits to configure a HARQ-ACK bitmap.

For example, referring to FIG. 17(a), when the size of the HARQ-ACK bitmap is 10 bits and M=4, HARQ-ACK information for 4 most recently received CG-PUSCHs may be sequentially mapped to the first 4 bits of the HARQ-ACK bitmap, and HARQ-ACK information for 6 most recently received DG-PUSCHs may be sequentially mapped to the remaining 6 bits.

In this case, HARQ-ACK information for CG-PUSCHs transmitted before $(M+1)^{th}$ from slot index #0 and HARQ-ACK information for DG-PUSCHs transmitted before $(N-M+1)^{th}$ from slot index #0 may not be included in the HARQ-ACK bitmap included in the CG-DFI.

The number (i.e., M) of HARQ-ACK information for the CG-PUSCH to be included in the HARQ-ACK bitmap may be determined based on higher layer signaling such as RRC, DCI, and/or the size of the HARQ-ACK bitmap. In addition, when information on the number of the HARQ-ACK information for the CG-PUSCH is signaled through the DCI, information on the number of HARQ-ACK information for the CG-PUSCH may also be included in the CG-DFI including the HARQ-ACK bitmap. In addition, in the case of the Type 2 CG configuration, the number of HARQ process IDs corresponding to the (de)activated CG through the DCI may be determined as the M value.

In addition, when the size of the HARQ-ACK bitmap is limited, [Proposed Method #5] and [Proposed Method #1] may be combined and implemented. For example, the size of the HARQ-ACK bitmap is N, and the number of bits for the CG-PUSCH among N bits is M, and in this regard, when the HARQ-ACK bitmap is configured based on HARQ-ACK information of M' most recently received CG-PUSCH and N' most recently received DG-PUSCHs, the HARQ-ACK information of the M' CG-PUSCHs may be configured as HARQ-ACK information for M bits using logical AND bundling and the HARQ-ACK information of the N' most recently received DG-PUSCHs may be configured as HARQ-ACK information for N-M bits using logical OR bundling. In the above-described example may be applied when M' is greater than M and N' is greater than N-M. In other words, when M' is equal to or smaller than M and N' is equal to or smaller than N-M, the HARQ-ACK bitmap may be configured without bundling.

[Proposed Method #6]

A method of configuring HARQ-ACK information for two groups of a CG HARQ group and a DG HARQ group for one HARQ process ID as a HARQ-ACK bitmap and transmitting the HARQ-ACK information in CG-DFI will be described.

In this case, a configured HARQ process pool may be considered regardless of an activation/release state of a CG configuration, or only the configured HARQ process pool of an activated CG may be considered based on the activation/release state of the CG configuration. In other words, HARQ-ACK information of the CG HARQ group may be determined in consideration of all sets of HARQ processes configured to the CG configured using an RRC signal for CG-PUSCH transmission, or HARQ-ACK information of the CG HARQ group may be determined in consideration of only the activated HARQ process(s) among the sets of the HARQ processes configured to the CG.

However, according to the size of the HARQ-ACK bitmap for each HARQ group, logical AND bundling may be performed on the HARQ-ACK information of the CG HARQ group, and logical OR bundling may be performed on the HARQ-ACK information of the DG HARQ group.

Since the size of various fields configuring DCI format 0_2 is variable depending on the configuration, the size of the HARQ-ACK bitmap for the CG/DG-PUSCH included in DCI format 0_2 transmitted for CG-DFI use may also be variable.

Even if a specific HARQ process ID is configured to the CG and is used for CG-PUSCH transmission, HARQ process IDs for the CG may also be scheduled with the DG-PUSCH. Therefore, the HARQ-ACK bitmap included in the CG-DFI may be separated into two groups of HARQ-ACK bits for the CG HARQ group and the DG HARQ group and may be configured.

For example, the HARQ-ACK information of the CG HARQ group may be sequentially mapped to the front of the HARQ-ACK bitmap regardless of the activation/release state of the CG configuration, and then the remaining bits of the HARQ-ACK bitmap may be mapped to the HARQ-ACK information for the all HARQ process IDs again to configure the HARQ-ACK bitmap.

As a result, two bits for each of the CG and the DG may be allocated to one HARQ process ID. For example, if the number of HARQ process IDs allocated to the CG is M=4, the HARQ-ACK bitmap included in the CG-DFI may be configured with the HARQ-ACK bitmap of total 20 bits by mapping a 4-bit HARQ-ACK bitmap for the CG to a front part and mapping a 16-bit HARQ-ACK bitmap only for the DG to a rear part. In addition, among 20 bits of the HARQ-ACK bitmap, 4 bits for the CG HARQ group may be mapped, and logical OR bundling may be performed in the DG HARQ group according to the number of remaining bits to configure the HARQ-ACK bitmap.

Alternatively, based on the activation/release state of the CG configuration, only HARQ-ACK information of the activated CG HARQ group may be first mapped to the front part of the HARQ-ACK bitmap, and the remaining bits of the HARQ-ACK bitmap may be mapped to the HARQ-AKC information of the DG HARQ group to configure a HARQ-ACK bitmap. If bundling is configured in the CG HARQ group, logical AND bundling may be performed, and if bundling is configured in the DG HARQ group, logical OR bundling may be performed. In addition, among the CG HARQ group and the DG HARQ group, bundling may be performed for only one HARQ group and mapped to the HARQ-ACK bitmap, and the remaining HARQ groups may be mapped to the HARQ-ACK bitmap without bundling to configure the HARQ-ACK bitmap.

The above proposed methods may be applied even when the size of the HARQ bitmap of the CG-DFI transmitted in DCI format 0_2 is N<16 and may also be extended even when the size of the HARQ bitmap of the CG-DFI is N=>16.

[Proposed Method #7]

A configuration method for always transmitting only a HARQ-ACK bitmap of Q bits when CG-DFI is transmitted in DCI format 0_2 will be described. That is, [Proposed Method #7] is a method in which the BS ensures at least the number of bits to be included in the corresponding HARQ-ACK bitmap.

Since the sizes of various fields configuring DCI format 0_2 are variable according to the configuration, the size of the HARQ-ACK bitmap for the CG/DG-PUSCH of DCI format 0_2 transmitted in CG-DFI may also be variable.

However, when the BS transmits DCI format 0_2 for the CG-DFI, the size of the HARQ-ACK bit in the rule configuration for each field configuring the CG-DFI may always be ensured as M bit HARQ-ACK bitmap (that is, Q=M). In this case, when DCI format 0_2 for the CG-DFI is transmitted, field sizes of other fields may vary according to RRC configuration, but the number of bits of the HARQ-ACK bitmap including the HARQ-ACK information may always be ensured, and thus the UE may always expect to receive the HARQ-ACK bitmap of Q bits.

For example, if Q=16 bits, the HARQ-ACK information for the all HARQ process IDs may be included in DCI format 0_2 in the same way as the CG-DFI transmitted through DCI format 0_1.

[Proposed Method #8]

A method of including HARQ-ACK information for the DG-PUSCH(s) (e.g., a PUSCH scheduled with a Dynamic UL grant) in CG-DFI when the BS configures/instructs a Type 1 Configured grant or a Type 2 Configured grant to the UE and configures CBG-based transmission or retransmission for the PUSCH will be described.

When code block groups (CBGs) determined as ACK based on all CBGs configuring the DG-PUSCH(s) included in a specific slot is less than 10% of the total number of CBGs, all of the HARQ-ACK information for the HARQ process ID corresponding to the DG-PUSCH(s) to be included in the CG-DFI may be configured as NACK.

In addition, when CBGs determined as ACK based on all CBGs configuring DG-PUSCH(s) included in a specific slot is 10% or more of the total number of CBGs, HARQ-ACK information for the HARQ process ID corresponding to DG-PUSCH(s) to be included in the CG-DFI may be configured as follows.

A) HARQ-ACK information of all DG-PUSCH(s) is configured as ACK

B) A method of configuring only HARQ-ACK information for specific DG-PUSCH(s) as ACK, where specific DG-PUSCH(s) may be selected as follows.

B-1) One or more DG-PUSCHs randomly selected by BS

B-2) DG-PUSCH having smallest HARQ process ID and/or DG-PUSCH having largest HARQ process ID among DG-PUSCHs included in specific slot B-3) All DG-PUSCHs in which CBGs determined as ACK is 10% or more of the total number of CBGs configuring the DG-PUSCH, or any one or more DG-PUSCH(s) among DG-PUSCHs included in a specific slot. Here, any one or more DG-PUSCH(s) is determined based on B-1) or B-2) described above, that is, one or more DG-PUSCHs randomly selected by the BS among DG-PUSCHs in which CBGs determined as ACK is 10% or more of the total number of CBGs configuring the DG-PUSCH or a DG-PUSCH having the smallest HARQ process ID and/or a DG-PUSCH having the largest HARQ process ID among DG-PUSCHs in which CBGs determined as ACK is 10% or more of the total number of CBGs configuring the DG-PUSCH.

In detail, when the Type 1 Configured grant or the Type 2 Configured grant is configured in a serving cell, CG-DFI may include HARQ-ACK information for at least one HARQ process ID corresponding to the CG-PUSCH and the DG-PUSCH as a HARQ-ACK bitmap. The HARQ-ACK information corresponding to one HARQ process ID may be 1 bit.

If the PUSCH of the serving cell is configured for CBG-based (re)transmission, HARQ-ACK information for each CBG configuring each PUSCH may be included in the CG-DFI, or 1-bit HARQ-ACK information in a transport block (TB) unit may be included therein. HARQ-ACK information corresponding to the CG-PUSCH included in the CG-DFI may be for a HARQ operation for actual retransmission, and HARQ-ACK information corresponding to the DG-PUSCH is information used only for CWS adjustment, and thus a bundling method of HARQ-ACK information for each PUSCH may be different depending on whether it is a CG-PUSCH or a DG-PUSCH.

The proposed method relates to a method of configuring HARQ-ACK information of a CBG-based DG-PUSCH to be included in CG-DFI, and HARQ-ACK information for DG-PUSCH(s) may be included in the CG-DFI using the aforementioned methods according to an ACK or NACK result of all CBSs configuring the corresponding DG-PUSCH(s) for DG-PUSCH(s) of a specific slot referenced for CWS adjustment.

For example, if there are 5 DG-PUSCHs included in a specific slot and 4 CBGs configuring each DG-PUSCH, since the total number of CBGs is 20, a criteria for CWS adjustment is two corresponding to 10% of all CBGs. If the number of CBGs determined as ACK among all CBGs is less than two, HARQ-ACK information for a HARQ process ID corresponding to DG-PUSCH(s) to be included in CG-DFI may be configured as NACK to increase the CWS of the UE to a larger available CWS value in a next step.

In contrast, if the number of CBGs determined as ACK is two or more, 1) all HARQ-ACK information for a HARQ process ID corresponding to DG-PUSCH(s) to be included in the CG-DFI may be configured as ACK, 2) only one or more DG-PUSCHs randomly selected by the BS may be configured as ACK, 3) only a DG-PUSCH having the smallest HARQ process ID and/or a DG-PUSCH having the largest HARQ process ID among DG-PUSCHs included in a specific slot may be configured as ACK, or 4) all DG-PUSCHs in which CBGs determined as ACK is 10% or more of the total number of CBGs configuring the DG-PUSCH, or any one or more DG-PUSCH(s) thereamong may be configured as ACK, and the CWS of the UE may be reset to the minimum value.

The proposed method may be applied to all DCI formats to be used for CG-DFI transmission.

[Proposed Method #9]

A method of configuring a HARQ-ACK bitmap for a CBG-based CG-PUSCH and a CBG-based DG-PUSCH in CG-DFI by a BS and a method of adjusting a CWS based on CG-DFI received by a UE when CBG-based (re)transmission is configured for a PUSCH will be described.

Method (1)

The BS may configure the HARQ-ACK information for the HARQ process ID corresponding to the (initial) CG-PUSCH (configured as a CG) transmitted initially as ACK only when TB is successfully decoded.

1) The HARQ-ACK information for the HARQ process ID corresponding to the DG-PUSCH may be configured as ACK to configure a HARQ-ACK bitmap using the same method as A to B below (including B-1 to B-3) when (the number of CBGs determined as ACK)/(the total number of CBGs)*100 is calculated and the result value is 10% or more of the number of CBGs configuring all CG PUSCHs and DG PUSCHs included in a specific slot, or 2) When (the number of CBGs determined as ACK)/(the total number of CBGs)*100 is calculated and the result value is 10% or more of CBGs configuring specific DG-PUSCHs (for example, CBG-based PUSCHs CBG-based PUSCH scheduled with non-fallback DCI or only DG-PUSCH) included in a specific slot, the HARQ-ACK information for the HARQ process ID corresponding to the DG-PUSCH may be determined as ACK to configure a HARQ-ACK bitmap using the same method as A to B below (including B-1 to B-3), and otherwise (i.e., when the result value is less than 10%), all of the HARQ-ACK information corresponding to a DG-PUSCH in the HARQ-ACK bitmap of the CG-DFI may be configured as NACK to induce increase in the CWS of the UE. If only the CBG-based PUSCH scheduled to specific DG-PUSCHs with non-fallback DCI is considered, the TB-based PUSCH scheduled with the fallback DCI may be determined as ACK only when TB is successfully decoded like the CG-PUSCH.

A) HARQ-ACK information of all DG-PUSCH(s) is configured as ACK.

B) Only HARQ-ACK information for specific DG-PUSCH(s) is configured as ACK, where specific DG-PUSCH(s) may be selected as follows.

B-1) One or more DG-PUSCHs randomly selected by BS

B-2) DG-PUSCH having smallest HARQ process ID and/or DG-PUSCH having largest HARQ process ID among DG-PUSCHs included in specific slot B-3) All DG-PUSCHs in which CBGs determined as ACK is 10% or more of the total number of CBGs configuring the DG-PUSCH, or any one or more DG-PUSCH(s) among DG-PUSCHs included in a specific slot. Here, any one or more DG-PUSCH (s) is determined based on B-1) or B-2) described above, that is, one or more DG-PUSCHs randomly selected by the BS among DG-PUSCHs in which CBGs determined as ACK is 10% or more of the total number of CBGs configuring the DG-PUSCH or a DG-PUSCH having the smallest HARQ process ID and/or a DG-PUSCH having the largest HARQ process ID among DG-PUSCHs in which CBGs determined as ACK is 10% or more of the total number of CBGs configuring the DG-PUSCH.

When the UE receives the CG-DFI configured based on the above-described method (1), if any one of the HARQ process IDs for several PUSCHs included in the reference duration is configured as ACK, the CWS may be reset to the minimum value, and otherwise, the CWS value may be increased to the next available value.

In addition, a buffer of the corresponding HARQ process may be flushed only when the HARQ-ACK information for the HARQ process ID (configured as a CG) corresponding to the CG-PUSCH in the CG-DFI is ACK, and if configuredGrantTimer and/or cg-RetransmissionTimer is configured, a timer may be stopped.

If the HARQ-ACK information is NACK, the HARQ-ACK information may not be referenced for CWS adjustment, and when (the number of CBGs determined as ACK)/(all CBG count)*100 may be calculated and the result value is 10% or more of CBG Transmission Information (CBGTI) of the retransmission scheduling UL grant of the corresponding HARQ process, the CWS may be reset, and otherwise, the CWS may be increased to a larger available CWS value in a next step.

Method (2)

When (re)transmission of the CBG unit is configured in the PUSCH, the HARQ-ACK information included in the HARQ-ACK bitmap of the CG-DFI may be used only for CWS adjustment. In this case, when (the number of CBGs determined as ACK)/(the total number of CBGs)*100 is calculated and the result value is 10% or more of CBGs configuring all CG-PUSCHs and DG-PUSCHs present in a specific slot, the BS may determine the HARQ-ACK information for the HARQ process ID corresponding to the CG-PUSCH and the DG-PUSCH as ACK to configure a HARQ-ACK bitmap using the same method as A to B below (including B-1 to B-3) of Method (1) below, and otherwise (i.e., when the result value is less than 10%), all of the HARQ-ACK information included in the HARQ-ACK bitmap of the CG-DFI may be configured as NACK to induce increase in the CWS of the UE.

A procedure of determining whether a CBG-based CG-PUSCH corresponding to a bit configured as ACK is successful and retransmitting the CBG-based CG-PUSCH in a HARQ-ACK bitmap when the UE receives the CG-DFI configured in the same way as described above may be performed as follows.

1) When configuredGrantTimer and/or cg-RetransmissionTimer-r16 is configured, if a corresponding timer expires, the UE may regard transmission of the corresponding CBG-based CG-PUSCH to be successful.

2) When the UE receives a UL grant indicating retransmission of the corresponding CBG-based CG-PUSCH before the configuredGrantTimer and/or the cg-RetransmissionTimer-r16 expires, the UE may start or restart the configuredGrantTimer and/or the cg-RetransmissionTimer-r16 and may retransmit only a CBG as NACK to a DG-PUSCH according to CBGTI. In this case, even if ACK corresponding to a PUSCH indicated to be retransmitted to a UL grant through CG-DFI is received, the two timers may not be stopped and may continuously run, and thus a new TB may not be transmitted through a CG resource with a corresponding HARQ process ID of the UE.

However, in Methods (1) to (2), CWS adjustment of the UE through the HARQ-ACK bitmap included in the CG-DFI may be performed based on valid HARQ-ACK information with a PUSCH to CG-DFI timeline satisfying cg-minDFlDelay-r16 among all of the HARQ-ACK information of the HARQ process IDs included in the HARQ-ACK bitmap. In addition, fallback DCI may mean DCI format 0_0, and non-fallback DCI may mean DCI format 0_1 and/or DCI format 0_2.

In detail, since the CG-DF includes only TB-unit HARQ-ACK information for the CG-PUSCH and the DG-PUSCH, when CBG-unit PUSCH (re)transmission is configured to the UE, HARQ-ACK information corresponding to the CG-PUSCH or DG-PUSCH needs to be appropriately configured according to HARQ-ACK information of CBGs configuring each PUSCH to properly induce CWS adjustment of the UE. When the HARQ-ACK information corresponding to the HARQ process ID configured for CG-PUSCH transmission is ACK, flush of a buffer of the UE and new TB transmission may be induced, and when the HARQ-ACK information corresponding to the HARQ process ID configured for CG-PUSCH transmission is NACK, retransmission through a CG resource may be induced. However, when retransmission in a CBG unit through a CG resource is not possible, other use in addition to inducing of retransmission may be considered.

HARQ-ACK information corresponding to the CBG-based CG-PUSCH included in the CG-DFI in Method (1) above may be configured as ACK only when all CBGs are ACK. In addition, the UE may reset the CWS to a minimum value and may transmit a new TB.

When all CBGs are not ACKs, that is, when even one CBG is NACK, HARQ-ACK information corresponding to CBG-based CG-PUSCH may be configured as NACK. In addition, the UE may not refer to the corresponding HARQ- ACK information for CWS adjustment and may perform CWS adjustment based on a UL grant for scheduling retransmission of the CG-PUSCH.

The HARQ-ACK information corresponding to the CBG-based DG-PUSCH may be used only for CWS adjustment, and accordingly, may be configured as ACK or NACK through statistics of HARQ-ACK information of CBGs configuring all PUSCHs transmitted in a specific slot. In detail, when more than 10% of CBGs among all CBGs are ACKs from definition of a CWS adjustment procedure in TS 37.213 or when at least one TB is ACK, the CWS may be reset to a minimum value. In other cases, that is, if a CBG as ACK is less than 10% or all TBs are NACK, the CWS may be increased to a next available CWS value, and thus the HARQ-ACK information may be determined as ACK when (the number of CBGs determined as ACK)/(the total number of CBGs)*100 is calculated and the result value is 10% or more of the number of CBGs configuring all CG PUSCHs and DG PUSCHs transmitted in a specific slot, and to configure a HARQ-ACK bitmap using the same method as A to B above (including B-1 to B-3). In addition, if the CBG as ACK is less than 10% of the total number of CBGs, all of the HARQ-ACK information corresponding to the DG-PUSCH in the HARQ-ACK bitmap of the CG-DFI may be configured as NACK to induce increase in the CWS of the UE.

CWS adjustment of the UE through the HARQ-ACK bitmap included in the CG-DFI may be performed based on valid HARQ-ACK information with a PUSCH to CG-DFI timeline satisfying cg-minDFlDelay-r16 among all of the HARQ-ACK information of the HARQ process IDs included in the HARQ-ACK bitmap. For example, in the case of TB-unit HARQ-ACK transmission, if there is any ACK among the valid HARQ-ACK information, the UE may reset the CWS to the minimum value, and if all of the valid HARQ-ACK information is NACK, the CWS may be increased to the next available value. Therefore, when configuring the HARQ-ACK bitmap included in the CG-DFI through Method (1), the HARQ-ACK information corresponding to the DG-PUSCH may be configured based on Methods A to B above (B-1 to B-3) to induce proper CWS adjustment of the UE.

When the CBG-based CG-PUSCH and the CBG-based DG-PUSCH in Method (2) above are allowed to be retransmitted in CBG units only with a UL grant, a HARQ operation may not be performed with the HARQ-ACK bitmap included in the CG-DFI, and the HARQ-ACK bitmap included in the CG-DFI may be used only for CWS adjustment.

Therefore, similarly to a method of configuring the HARQ-ACK information of the DG-PUSCH in Method (1), when (the number of CBGs determined as ACK)/(the total number of CBGs)*100 is calculated and the result value is 10% or more of the number of CBGs configuring all CG PUSCHs and DG PUSCHs included in a specific slot, the HARQ-ACK bitmap may also be determined as ACK to configure a HARQ-ACK bitmap using the same method as A to B (including B-1 to B-3) of Method (1) above.

If CBGs determined as ACK is less than 10% of all CBGs, all of HARQ-ACK information of the HARQ-ACK bitmap of the CG-DFI may be configured as NACK to induce increase in the CWS of the UE. When the configuredGrantTimer is configured, the UE may regard the CBG-based CG-PUSCH to be successfully transmitted (ACK) when the corresponding timer expires.

Alternatively, when cg-RetransmissionTimer-r16 is configured, if the corresponding timer expires, the CBG-based CG-PUSCH may be regarded to be successfully transmitted. If the UE receives a UL grant indicating retransmission of the corresponding CBG-based CG-PUSCH before the two timers described above expire, only the CBG as NACK may be retransmitted according to the CBGTI.

[Proposed Method #10]

A method of adjusting a CWS of a UE when UL Grant and CG-DFI including a decoding result for the CBG-based CG-PUSCH or the CBG-based DG-PUSCH transmitted from the UE are received in the same slot or consecutive slots will be described.

Method (1)

The UE may adjust the CWS according to CG-DFI or UL grant that is first received in a time sequence and may not apply HARQ-ACK information corresponding to the same HARQ process ID in the CG-DFI or the UL grant that is received later to CWS adjustment.

Method (2)

Conditionally, the CWS may be adjusted according to the UL Grant.

If the UE receives the CG-DFI first and the HARQ-ACK information corresponding to the CBG-based CG-PUSCH is ACK, the CWS may be reset, and 1) if the HARQ-ACK information corresponding to the CBG-based CG-PUSCH is NACK, the CWS may be adjusted according to whether CBGs determined ACK is 10% or more of CBGTI of UL grant for retransmission scheduling of the corresponding HARQ process ID without reference to CWS adjustment, or 2) if the HARQ-ACK information corresponding to the CBG-based CG-PUSCH is NACK, the CWS may be updated once according to a criteria for CWS adjustment (e.g., the CWS is increased to an available value in a next step), but if 10% or more of all the CBGs in a CBGTI field of the retransmission UL grant corresponding to the corresponding HARQ process ID is determined as ACK, the CWS may be reset.

However, CWS adjustment of the UE through the HARQ-ACK bitmap included in the CG-DFI in Methods (1) and (2) may be performed based on valid HARQ-ACK information with a PUSCH to CG-DFI timeline satisfying cg-minD-FIDelay-r16 among all of the HARQ-ACK information corresponding to the HARQ process IDs included in the HARQ-ACK bitmap. In addition, since TB-unit HARQ-ACK information is included in the CG-DFI, if even HARQ-ACK information corresponding to one HARQ process ID is ACK based on valid HARQ-ACK information, the CWS may be reset to a minimum value, and if all of the HARQ-ACK information is NACK, the CWS may be increased to an available value in a next step.

In detail, in NR, CG-DFI and UL grant including HARQ-ACK information of the corresponding PUSCH based on the decoding result for the CBG-based CG-PUSCH or the CBG-based DG-PUSCH transmitted by the UE may be received in one slot or consecutive slots.

In this case, if any one of the valid HARQ-ACK information is ACK in the case of CG-DFI based on the HARQ-ACK information included in the first received in time order as in Method (1) above, the CWS may be reset to the minimum value. In addition, if all of the valid HARQ-ACK information is NACK, a CWS adjustment procedure for increasing the CWS to an available value in a next step may be performed, and the HARQ-ACK information corresponding to the same HARQ process ID in the CG-DFI or UL grant received later may not be applied to CWS adjustment.

Like in Method (2) above, CWS adjustment may be performed based on CBG-unit HARQ-ACK information of the UL grant, but when CG-DFI is first received and the valid HARQ-ACK information is NACK, like in 1), the HARQ-ACK information may not be applied to CWS adjustment, or like in 2), NACK may be applied to CWS adjustment once to increase the CWS to an available value in a next step, and then the CWS may be reset when 10% or more of all CBGs is ACK through a CBGTI field of the UL grant for scheduling retransmission of the corresponding HARQ process ID.

[Proposed Method #11]

A method of adjusting a CWS based on HARQ-ACK information of a DG-PUSCH (e.g., a PUSCH scheduled to a dynamic UL grant) included in the CG-DFI when the BS configures/instructs a Type 1 Configured grant or a Type 2 Configured grant to the UE and configures CBG-based (re)transmission for the PUSCH to the UE will be described. Here, even if the UE transmits the CBG-based DG-PUSCH, the HARQ-ACK information included in the CG-DFI may be expressed based on a TB unit.

Method (1)

For the DG-PUSCH(s) included in the reference duration, when all of the HARQ-ACK information for HARQ process IDs corresponding to DG-PUSCH(s) included in the CG-DFI is NACK, a CWS value for each priority class may be increased to an available CWS value in a next step.

Method (2)

For the DG-PUSCH(s) included in a reference duration, when HARQ-ACK information is configured as follows for HARQ process IDs corresponding to DG-PUSCH(s) included in the CG-DFI, a CWS value for each priority class may be reset to a minimum value.

A) When HARQ-ACK information of all DG-PUSCH(s) is configured as ACK

B) When HARQ-ACK information for specific one or more DG-PUSCHs is ACK

In detail, in Methods (1) and (2) above, PUSCH(s) referenced for CWS adjustment may be selected according to definition of a reference duration as shown in [Table 10] below.

TABLE 10

The reference duration corresponding to a channel occupancy initiated by the UE including transmission of PUSCH(s) is defined in this clause as a duration starting from the beginning of the channel occupancy until the end of the first slot where at least one unicast PUSCH is transmitted over all the resources allocated for the PUSCH, or until the end of the first transmission burst by the UE that contains unicast PUSCH(s) transmitted over all the resources allocated for the PUSCH, whichever occurs earlier. If the channel occupancy includes a unicast PUSCH, but it does not include any unicast PUSCH transmitted over all the resources allocated for that PUSCH, then, the duration of the first transmission burst by the UE within the channel occupancy that contains PUSCH(s) is the reference duration for CWS adjustment.

When a Type 1 Configured grant or a Type 2 Configured grant and CBG-based PUSCH transmission are configured to the UE, the CWS may be adjusted according to the HARQ-ACK information of the DG-PUSCH included in the CG-DFI. Here, even if the UE transmits a CBG-based PUSCH, the HARQ-ACK information included in the CG-DFI may be expressed based on TB units, and thus the UE may increase the CWS or may reset the CWS based on the HARQ-ACK information of the HARQ process ID corresponding to the DG-PUSCH like in Methods (1) and/or (2).

For DG-PUSCH(s) included in the reference duration of the UE, when all of the HARQ-ACK information for HARQ process IDs corresponding to DG-PUSCH(s) included in the CG-DFI is NACK, a CWS value for each priority class may be increases an available CWS value in a next step.

Alternatively, for the DG-PUSCH(s) included in the reference duration of the UE, 1) when all of the HARQ-ACK information for HARQ process IDs corresponding to the DG-PUSCH(s) included in the CG-DFI is ACK, or 2) when HARQ-ACK information for specific one or more DG-PUSCHs is ACK, the UE may reset a CWS value for each priority class to a minimum value.

The embodiments described in the above-mentioned Proposed Method #1 to Proposed Method #11 may be performed independently of each other, or may also be implemented in the form of a combination thereof. For example, the plurality of embodiments described in one proposed method may be implemented in the form of a combination thereof, or the plurality of embodiments described in the plural proposed methods may also be implemented in the form of a combination thereof.

The content of the present disclosure may not be limited to transmission and reception of uplink and/or downlink signals. For example, the content of the present disclosure may also be applied to UE-to-UE direct communication. In addition, the term "base station" according to the present disclosure may conceptually include not only a base station (BS) but also a relay node. For example, the BS operation according to the present disclosure may be performed by the BS, but may also be performed by the relay node.

Since examples of the above-described various proposals may also be included as implementation methods of the present disclosure, it is obvious that they may be regarded as a kind of proposed methods. The present disclosure is not limited to direct communication between UEs, and may also be used in uplink or downlink communication, and at this time, a base station or a relay node can use the proposed method. Rules can be defined in a manner that information about whether the above-described proposed methods are applied (or information about the rules of the proposed methods) can be signaled from the BS to the UE or from the Tx UE to the Rx UE through pre-defined signaling (e.g., physical layer signaling or higher layer signaling).

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
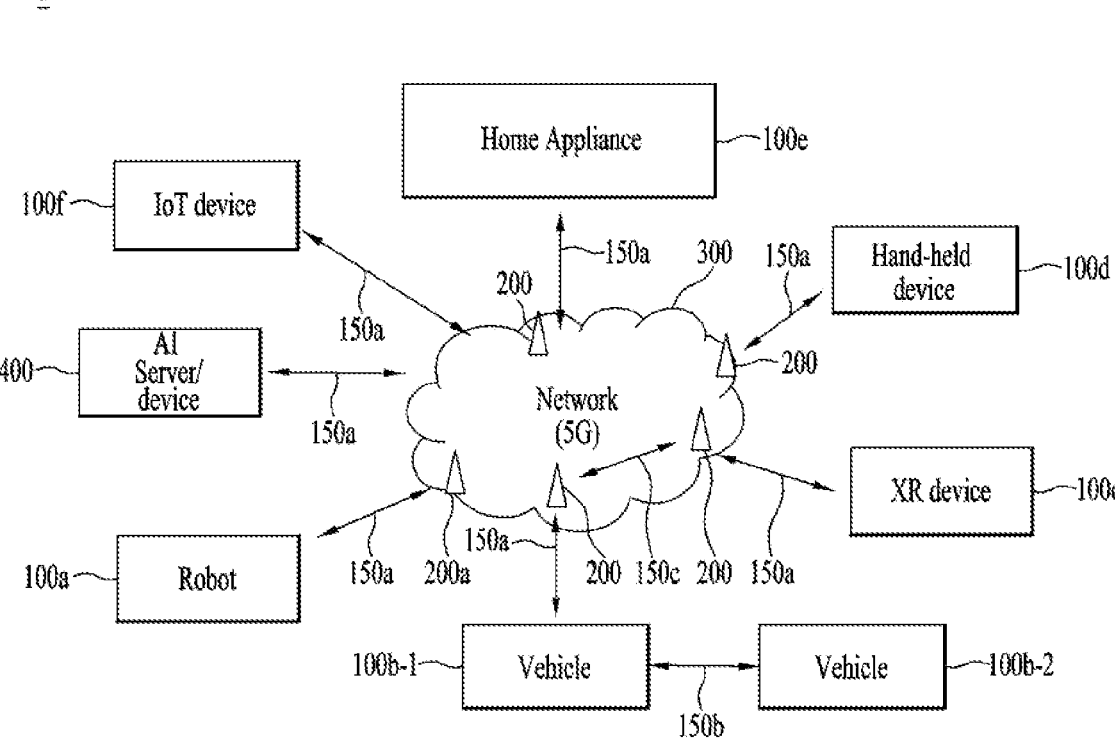
FIG. 18 illustrates an exemplary communication system applied to the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 19:
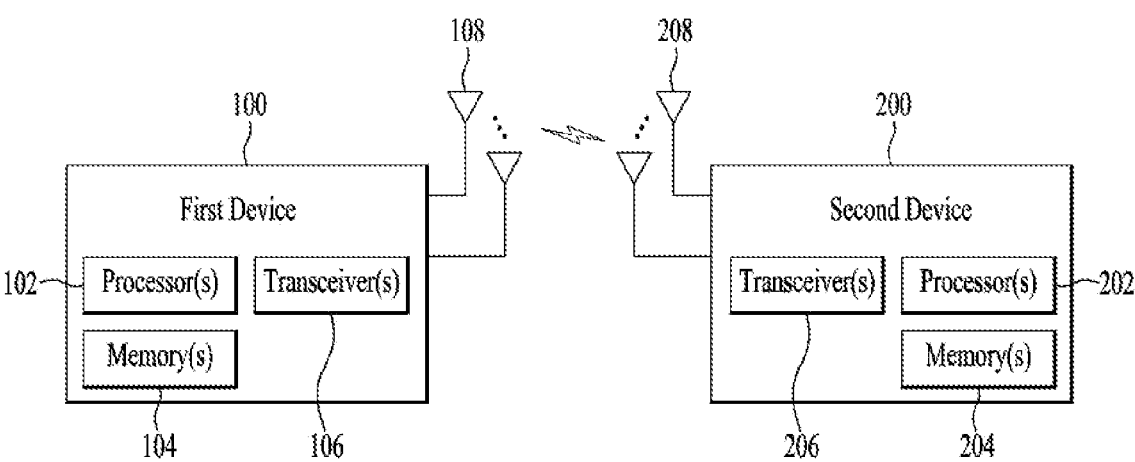
FIG. 19 illustrates an exemplary wireless device applicable to the present disclosure.

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will be described.

Although the following operations will be described based on a control operation of the processor 102 in terms of the processor 102, software code for performing such an operation may be stored in the memory 104. For example, in the present disclosure, the at least one memory 104 may be a computer-readable storage medium and may store instructions or programs. The instructions or programs may cause, when executed, the at least one processor operably connected to the at least one memory to perform operations according to embodiments or implementations of the present disclosure, related to the following operations.

In detail, the processor 102 may perform LBT for each of CG-PUSCH and DG-PUSCH. That is, the processor 102 may perform LBT for CG-PUSCH transmission and LBT for DG-PUSCH transmission. When LBT for CG-PUSCH is successful, the processor 102 may control the transceiver 106 to transmit a CG-PUSCH, and when LBT for DG-PUSCH is successful, the processor 102 may control the transceiver 106 to transmit a DG-PUSCH.

Then, the processor 102 may control the transceiver 106 to receive DCI (i.e., DCI for DFI use) including a HARQ-ACK bitmap related to HARQ-ACK information of the transmitted CG-PUSCH and DG-PUSCH. Here, a detailed method of configuring a received HARQ-ACK bitmap and interpreting a HARQ-ACK bitmap by a UE may be based on [Proposed Method #1] to [Proposed Method #11] above.

The processor 102 may adjust the CWS based on bits for the DG-PUSCH in the HARQ-ACK bitmap. For example, if there is at least one ACK in bits for the DG-PUSCH, the CWS may be maintained, and if all bits for the DG-PUSCH are NACK, the CWS may be increased. In another example, when the DG-PUSCH corresponds to CBG-based transmission, if 10% or more of bits for the DG-PUSCH are ACK, the CWS may be maintained, and if ACK bits are less than 10%, the CWS may be increased.

When LBT is performed based on the adjusted CWS and is successful, the processor 102 may control the transceiver 106 to transmit a CG-PUSCH based on bits for the CG-PUSCH of the HARQ-ACK bitmap. For example, among the bits for the CG-PUSCH, the CG-PUSCH for the HARQ process corresponding to bits as ACK may transmit a new transport block/code block/code block group, and the CG-PUSCH for the HARQ process corresponding to bits as NACK may retransmit a transport block/code block/code block group.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 100 and stored in the memory 204 of the second wireless device 200, according to an embodiment of the present disclosure will be described.

Although the following operations will be described based on a control operation of the processor 202 in terms of the processor 202, software code for performing such an operation may be stored in the memory 204. For example, in the present disclosure, the at least one memory 204 may be a computer-readable storage medium and may store instructions or programs. The instructions or programs may cause, when executed, the at least one processor operably connected to the at least one memory to perform operations according to embodiments or implementations of the present disclosure, related to the following operations.

In detail, the processor 202 may control the transceiver 206 to receive the CG-PUSCH and the DG-PUSCH and may perform LBT in order to transmit HARQ-ACK information of the CG-PUSCH and the DG-PUSCH based on the decoding result of the received CG-PUSCH and DG-PUSCH.

When LBT is successful, the processor 202 may control the transceiver 206 to transmit DCI (i.e., DCI for DFI use) including a HARQ-ACK bitmap related to the HARQ-ACK information of the CG-PUSCH and the DG-PUSCH. Here, a detailed method of configuring the HARQ-ACK bitmap by the processor 202 may be based on [Proposed Method #1] to [Proposed Method #11] above.

The processor 202 may control the transceiver 206 to receive the transmitted CG-PUSCH based on bits for the CG-PUSCH. For example, among bits for the CG-PUSCH, when the UE transmits the CG-PUSCH for the HARQ Process corresponding to a bit as ACK to the processor 202, the corresponding CG-PUSCH may be for transmitting a new transport block/code block/code block group. In addition, when the UE transmit the CG-PUSCH for the HARQ Process corresponding to a bit as NACK to the processor 202, the corresponding CG-PUSCH may be for retransmitting a transport block/code block/code block group.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/ channels processed using the one or more processors 102 and 202 from the baseband signals into the RF band signals. To this end, the one or more transceivers 106 and 206 may include (analog) oscillators and/or filters.

Figure 20:
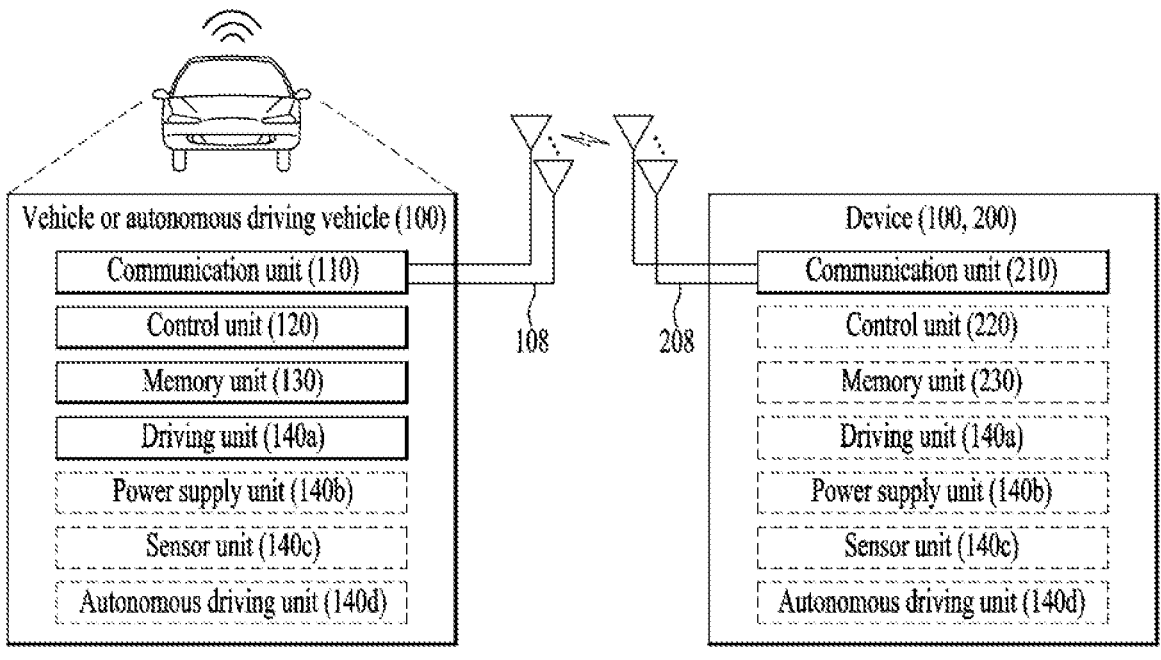
FIG. 20 illustrates an exemplary vehicle or autonomous driving vehicle applicable to the present disclosure.

FIG. 20 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 20, a vehicle or autonomous driving vehicle 100 may include an antenna unit 108, a communication unit 110, a control unit 120, a driving unit 140_a_, a power supply unit 140_b_, a sensor unit 140_c_, and an autonomous driving unit 140_d_. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140_a_ may enable the vehicle or the autonomous driving vehicle 100 to drive on a road. The driving unit 140_a_ may include an engine, a motor, a powertrain, a wheel, a brake, a steering device, and so on. The power supply unit 140_b_ may supply power to the vehicle or the autonomous driving vehicle 100 and include a wired/wireless charging circuit, a battery, and so on. The sensor unit 140_c_ may acquire information about a vehicle state, ambient environment information, user information, and so on. The sensor unit 140_c_ may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140_d_ may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140_d_ may generate an autonomous driving route and a driving plan from the obtained data. The control unit 120 may control the driving unit 140_a_ such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140_c_ may obtain information about a vehicle state and/or surrounding environment information. The autonomous driving unit 140_d_ may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL AVAILABILITY

Although the aforementioned method of transmitting and receiving downlink control information and an apparatus therefor are mainly described based on an example applied to a $5^{th}$ generation NewRAT system, it may be possible to apply the method and the apparatus to various wireless communication systems in addition to the $5^{th}$ generation NewRAT system.

The invention claimed is:

1. A method performed by a user equipment (UE), the method comprising:

transmitting at least one configured granted-physical uplink shared channel;

transmitting at least one dynamic granted-physical uplink shared channel; and receiving downlink control information including hybrid automatic repeat request (HARQ) information, wherein the HARQ information includes N HARQ-acknowledgement (ACK) bits, wherein M HARQ-ACK bits among the N HARQ-ACK bits are for the at least one configured granted-physical uplink shared channel, and the M HARQ-ACK bits are related to at least one configured granted HARQ process, and wherein N-M HARQ-ACK bits are for the at least one dynamic granted-physical uplink shared channel.

2. The method of claim 1, wherein each of the N-M HARQ-ACK bits is generated based on logical OR bundling between the at least one dynamic granted-physical uplink shared channel.

3. The method of claim 1, wherein each of the M HARQ-ACK bits is generated based on HARQ-ACK information of each of the at least one configured granted-physical uplink shared channel.

4. The method of claim 1, wherein each of the M HARQ-ACK bits is generated based on logical AND bundling between the at least one configured granted-physical uplink shared channel.

5. The method of claim 1, wherein, based on a time of receiving the downlink control information, HARQ-ACK information for M most recently received configured granted-physical uplink shared channels is mapped to the M HARQ-ACK bits, and wherein, based on the time of receiving the downlink control information, HARQ-ACK information for N-M most recently received dynamic granted-physical uplink shared channels is mapped to the N-M HARQ-ACK bits.

6. A user equipment (UE), comprising:

at least one transceiver;

at least one processor; and at least one memory operatively connected to the at least one processor and configured to store instructions that when executed causes the at least one processor to perform operations, wherein the operations includes:

transmitting at least one configured granted-physical uplink shared channel;

transmitting at least one dynamic granted-physical uplink shared channel; and receiving downlink control information including hybrid automatic repeat request (HARQ) information, wherein the HARQ information includes N HARQ-acknowledgement (ACK) bits, wherein M HARQ-ACK bits among the N HARQ-ACK bits are for the at least one configured granted-physical uplink shared channel, and the M HARQ-ACK bits are related to at least one configured granted HARQ process, and wherein N-M HARQ-ACK bits are for the at least one dynamic granted-physical uplink shared channel.

7. The UE of claim 6, wherein each of the N-M HARQ-ACK bits is generated based on logical OR bundling between the at least one dynamic granted-physical uplink shared channel.

8. The UE of claim 6, wherein each of the M HARQ-ACK bits is generated based on HARQ-ACK information of each of the at least one configured granted-physical uplink shared channel.

9. The UE of claim 6, wherein each of the M HARQ-ACK bits is generated based on logical AND bundling between the at least one configured granted-physical uplink shared channel.

10. The UE of claim 6, wherein, based on a time of receiving the downlink control information, HARQ-ACK information for M most recently received configured granted-physical uplink shared channels is mapped to the M HARQ-ACK bits, and wherein, based on the time of receiving the downlink control information, HARQ-ACK information for N-M most recently received dynamic granted-physical uplink shared channels is mapped to the N-M HARQ-ACK bits.

11. A method performed by a base station, the method comprising:

receiving at least one configured granted-physical uplink shared channel;

receiving at least one dynamic granted-physical uplink shared channel; and transmitting downlink control information including hybrid automatic repeat request (HARQ) information, wherein the HARQ information includes N HARQ-acknowledgement (ACK) bits, wherein M HARQ-ACK bits among the N HARQ-ACK bits are for the at least one configured granted-physical uplink shared channel, and the M HARQ-ACK bits are related to at least one configured granted HARQ process, and wherein N-M HARQ-ACK bits are for the at least one dynamic granted-physical uplink shared channel.

* * * * *